(12) United States Patent
Barlas et al.

(10) Patent No.: US 10,279,981 B2
(45) Date of Patent: May 7, 2019

(54) REUSABLE ZIPPER-RECONFIGURABLE SHIPPING BOX

(71) Applicant: Returnity Innovations, Inc., Santa Cruz, CA (US)

(72) Inventors: Mitchell E. Barlas, Santa Cruz, CA (US); Thomas Bilodeau, Santa Cruz, CA (US)

(73) Assignee: Returnity Innovations, Inc., Santa Cruz, CA (US)

( * ) Notice: Subject to any disclaimer, the term of this patent is extended or adjusted under 35 U.S.C. 154(b) by 0 days.

(21) Appl. No.: 15/356,032

(22) Filed: Nov. 18, 2016

(65) Prior Publication Data

US 2018/0141698 A1 May 24, 2018

(51) Int. Cl.
| | |
|---|---|
| B65D 5/36 | (2006.01) |
| B65D 5/56 | (2006.01) |
| B65D 5/42 | (2006.01) |
| B65D 5/66 | (2006.01) |
| B65D 81/38 | (2006.01) |
| B65D 55/02 | (2006.01) |
| B65D 5/02 | (2006.01) |
| B65D 37/00 | (2006.01) |
| B65D 5/355 | (2006.01) |

(52) U.S. Cl.
CPC ....... *B65D 81/3897* (2013.01); *B65D 5/0005* (2013.01); *B65D 37/00* (2013.01); *B65D 2203/02* (2013.01); *B65D 2211/00* (2013.01); *Y02W 30/807* (2015.05)

(58) Field of Classification Search
CPC .......... B65D 5/36; B65D 5/02; B65D 5/4216; B65D 5/4266; B65D 5/56; B65D 5/6602; B65D 55/02; B65D 81/3813
USPC ........ 229/102, 108.1, 126; 383/38, 121.1, 4; 190/107; 220/7; 206/170, 546
See application file for complete search history.

(56) References Cited

U.S. PATENT DOCUMENTS

| | | | |
|---|---|---|---|
| 2,768,719 A | 2/1954 | Samuel | |
| 4,895,230 A * | 1/1990 | King | A45C 7/0077 190/103 |
| 5,562,228 A * | 10/1996 | Ericson | A45C 7/0077 206/545 |
| 5,896,962 A * | 4/1999 | Smith | A45C 3/00 190/107 |
| 5,904,230 A | 5/1999 | Peterson | |
| 6,068,402 A * | 5/2000 | Freese | A45C 11/20 383/108 |
| 8,985,432 B2 * | 3/2015 | Cullen | B65D 11/1853 206/170 |

(Continued)

*Primary Examiner* — Christopher Demeree
(74) *Attorney, Agent, or Firm* — Eric Scheuerlein; Daylight Law, P.C.

(57) ABSTRACT

A reusable shipping box with a shipping container state and a compacted state is disclosed. The reusable shipping box may comprise a lid that seals the shipping box, a base, and a set of four sidewalls. The shipping box may also comprises a zipper that: (i) zips down from the lid to the base between two adjacent sidewalk in the set of four sidewalls; (ii) is closed in the shipping container state; and (iii) is open in the compacted state. The shipping box may also comprises a cavity that is: (i) surrounded by the set of four sidewalls, the lid, and the base in the shipping container state; (ii) accessible via the lid when the shipping box is open; and (iii) collapsed in the compacted state.

24 Claims, 13 Drawing Sheets

(56) References Cited

U.S. PATENT DOCUMENTS

| | | |
|---|---|---|
| 2012/0006701 A1 | 1/2012 | Rothschild et al. |
| 2014/0117072 A1 | 5/2014 | Cullen et al. |
| 2014/0262862 A1 | 9/2014 | Rothschild et al. |

\* cited by examiner

FIG. 12
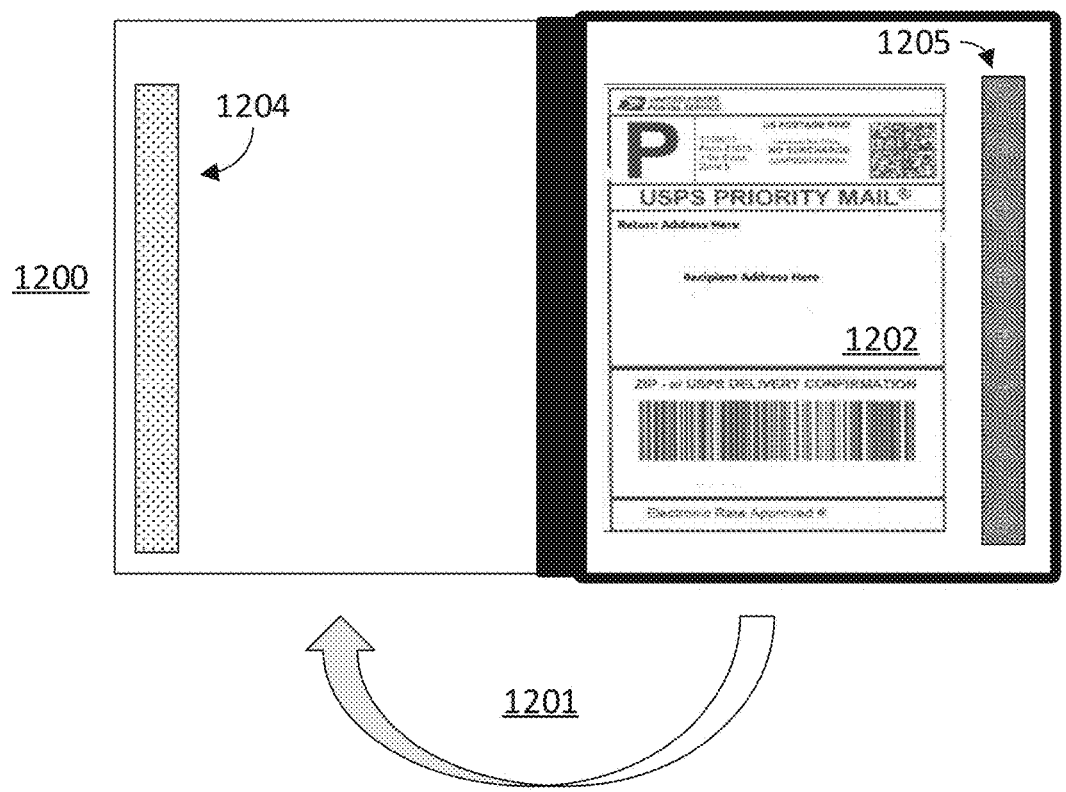
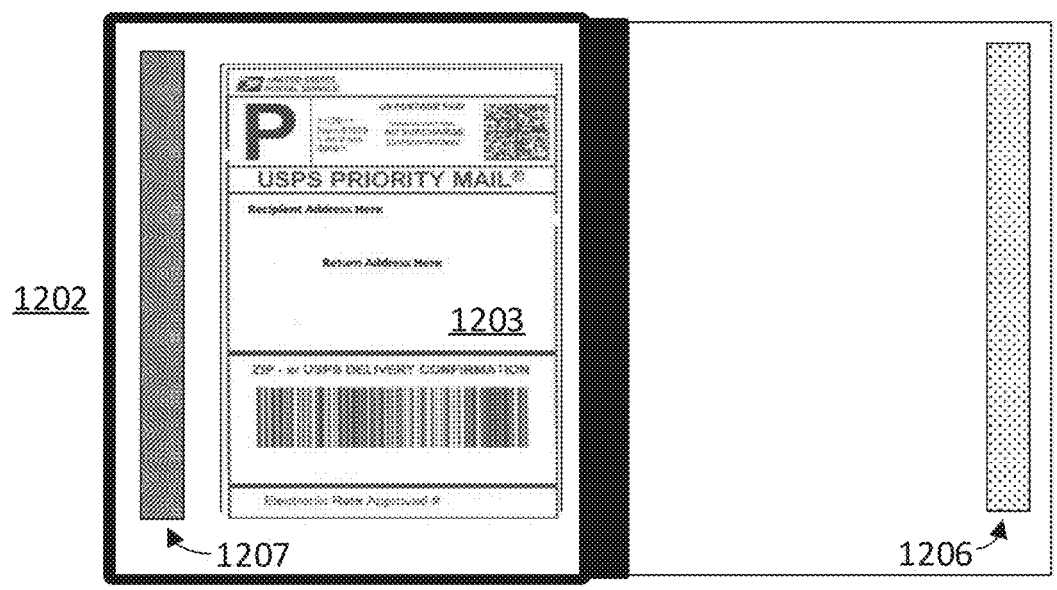

1300

REUSABLE ZIPPER-RECONFIGURABLE SHIPPING BOX

BACKGROUND OF THE INVENTION

As a sector, e-commerce has doubled in size in the past five years. Consumer demand for instant direct-to-door delivery for nearly every item consumed or utilized in the home continues to fuel this growth, and there is no indication that this trend will reverse itself or stabilize. Although the increase has brought considerable benefits in terms of consumer convenience and satisfaction, the environmental impact of this trend cannot be ignored. Direct-to-door delivery is simply not as efficient as bulk delivery to a lesser number of discrete retail locations. Although individuals still need to transport themselves to and from their homes on the way to those retail locations, there is little evidence to support the assertion that carbon emissions are thereby decreased when the countervailing effect of an increased number of delivery trucks and routes are taken into account.

Regardless, it is inarguable that direct-to-door delivery is far worse from a sustainability perspective when the increased amount of packaging material is taken into account. Even if plastics and fill materials are neglected, the amount of material consumed just on the outer packaging is striking. The United States consumed 35.4 million tons of container grade cardboard material in 2014. Although a portion of this material is recycled, no recycling process is perfectly efficient in terms of the amount of material recovered, and the process itself consumes resource in the form of energy, chemicals, and capital equipment depreciation.

Reusable shipping containers are not generally considered viable alternatives to disposable shipping containers. The cost of moving the material back through the mail creates an obstacle for reuse, as does the fact that shipping an item wears away at the packaging material such that the packaging material must be durable if it is to be reused. Finally, the packaging material is generally bulky in that it is has a rigid structure around a cavity to protect the item it contains, where the cavity is hollow and unused when the packaging material is returned. This fact exacerbates the problems associated with shipping the item back to the original sender because shipping costs are strongly correlated with the volume of an object.

SUMMARY

A shipping box is disclosed that is reusable and zipper-reconfigurable. The box is zipper-reconfigurable in that at least one zipper on the shipping box can be zipped or unzipped to place the shipping box in a shipping container state or a compacted state. The compacted state could be one in which the zipper has been unzipped and the various portions of the box have been folded into a compact bundle. The fact that the zipper is unzipped allows for reconfiguration of the box between the shipping container state and compacted states.

A compacted state is one in which either the volume or cross section of the shipping box has been reduced while neither the volume nor cross section of the shipping box has been increased. When the box is in the shipping container state, an item can be placed in the box by a sender for shipment using standard mail carriers to a recipient. Upon delivery, the recipient can remove the item from the box, and reconfigure the box into the compacted state. When the box is in the compacted state the box itself can be shipped using standard mail carriers. In particular, the recipient can send the compacted box back to the sender or to another location in order for the box to be used again.

The shipping box is reusable in that it can be sent out and returned multiple times thereby eliminating a large degree of waste associated with single-time use shipping boxes. The box can be returned in its shipping box state if the recipient needs to send the item, or another item, back to the sender. However, as postal rates and costs are constrained by the volume of items sent through the mail, the fact that the shipping box is reconfigurable to a compacted state provides the benefits of making the return shipment of an empty box less costly and more efficient. Although the example of a sender sending an item to a user and receiving a shipping box in a compacted state is used throughout this disclosure as an example, the shipping box could instead be sent out in a compacted state, filled by the recipient, and returned to the sender in a shipping box state with an item inside. The shipping box can be washed and refreshed after being received by the original sender so that it can be ready for use in another cycle. The box can also be repaired by replacing individual components of the box that have been worn out. In other words, the design of the box can be modularized to facilitate repairs and extend the life and reusability of the box.

In some embodiments, a reusable shipping box with a shipping container state and a compacted state is disclosed. The box includes a lid that seals the box, a base, and a set of four sidewalls. The box also includes a zipper that zips down from the lid to the base between two adjacent sidewalls in the set of four sidewalls. The zipper is closed in the shipping container state and is open in the compacted state. The box also includes a cavity that is surrounded by the set of four sidewalls, the lid, and the base in the shipping container state. The cavity is accessible via the lid when the shipping box is open and is collapsed when the shipping box is in the compacted state. An item can be placed in the cavity to transport the item. The volume occupied by the cavity can be saved when the shipping box is shipped in the compacted state.

In other embodiments, a reusable shipping box is disclosed. The box includes a base, a set of sidewalls, and a lid. The box also includes a cavity that is surrounded by the lid, the base, and the set of sidewalls when the shipping box is in a shipping container state. The cavity is collapsed when the shipping box is in a compacted state. The box also includes a zipper. The zipper seals the lid to a subset of three sidewalls in the set of sidewalls when it is fully zipped. The zipper allows the shipping box to be folded into the compacted state when it is fully unzipped. The zipper prevents the shipping box from being folded into the compacted state when it is half-way zipped. The box also includes a security feature connected to the zipper to detect a breach of the cavity. A point on a first sidewall from the set of sidewalls is in contact with a point on a second sidewall from the set of sidewalls in the compacted state. The point on the first sidewall from the set of sidewalls is not in contact with the point on the second sidewall from the set of sidewalls in the shipping container state.

In other embodiments, a reusable shipping box with a shipping container state and a compacted state are disclosed. The box includes a set of sides, a lid that seals the shipping box, a base, and a set of sidewalls. The box also includes a zipper that zips diagonally across one of the sides, is closed in the shipping container state, and is open in the compacted state. The box also includes a cavity. The cavity is surrounded by the set of sidewalls, the lid, and the base in the shipping container state. The cavity is also accessible via the lid when the shipping box is open. The cavity is collapsed in the compacted state. The box also includes a first shipping label area integrated with an exterior surface of the box when the box is in the shipping container state.

The reusable shipping box can exhibit numerous other features provided in the detailed description below. In particular, the box could include a second shipping label area that can be accessed along with the first shipping label area together at fulfillment to allow a worker to place both labels on the box at the same time. The second and first shipping label areas could be designed in such a way that only one shipping label area is visible in the shipping container state while the other shipping label area is visible in the compacted state. The shipping container could also be marked with a unique serial number to assist in tracking, maintaining, and retiring the reusable shipping box when necessary.

BRIEF DESCRIPTION OF DRAWINGS

FIG. 12 illustrates a double sided shipping label area.

DETAILED DESCRIPTION OF THE EMBODIMENTS

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the scope thereof. For instance, features illustrated or described as part of one embodiment may be used with another embodiment to yield a still further embodiment. Thus, it is intended that the present subject matter covers all such modifications and variations within the scope of the appended claims and their equivalents.

A reusable shipping box configured to be shipped in a shipping box state and a compacted state where at least one zipper is used to alter the configuration of the shipping box between the shipping box state and the compacted state is disclosed. The fact that the shipping box can be easily transitioned between the shipping box state and the compacted state provides significant benefits when applied to the specific application of reusable shipping boxes because it minimizes the inconvenience of reconfiguring the box for efficient transmission of the box in a compacted state through the mail. Indeed, in certain configurations discussed below, the consumer experience of unzipping the box and reconfiguring it for its compacted state is easier than disassembling and disposing of a traditional cardboard box. In certain configurations discussed below, the zipper and sides of the box are configured to provide maximum structural rigidity while still enabling rapid and efficient reconfiguration.

The box is reconfigurable between different states based on the state of a zipper. The zipper can be fully zipped, unzipped, or partially zipped. The zipper can be zipped by moving a slider along two sets of interlocking teeth that form a zipper track. The teeth may be formed on coils that are used to guide the zipper. The two sets of interlocking teeth can be formed on zipper tape extensions that are connected to the two materials being zipped together. Alternatively, the zipper teeth can be formed directly on the material that forms the exterior of a panel of the box. The zipper could be formed of plastic or metal. In some approaches, the zipper is fully zipped when it is placed in contact with a top stop located at one end of the zipper track. In some approaches, the zipper is fully unzipped when it is placed in contact with a bottom stop located at the other end of the zipper track. The zipper could also be a double pull zipper that can be unzipped or zipped in two directions using two sliders.

Figure 1:
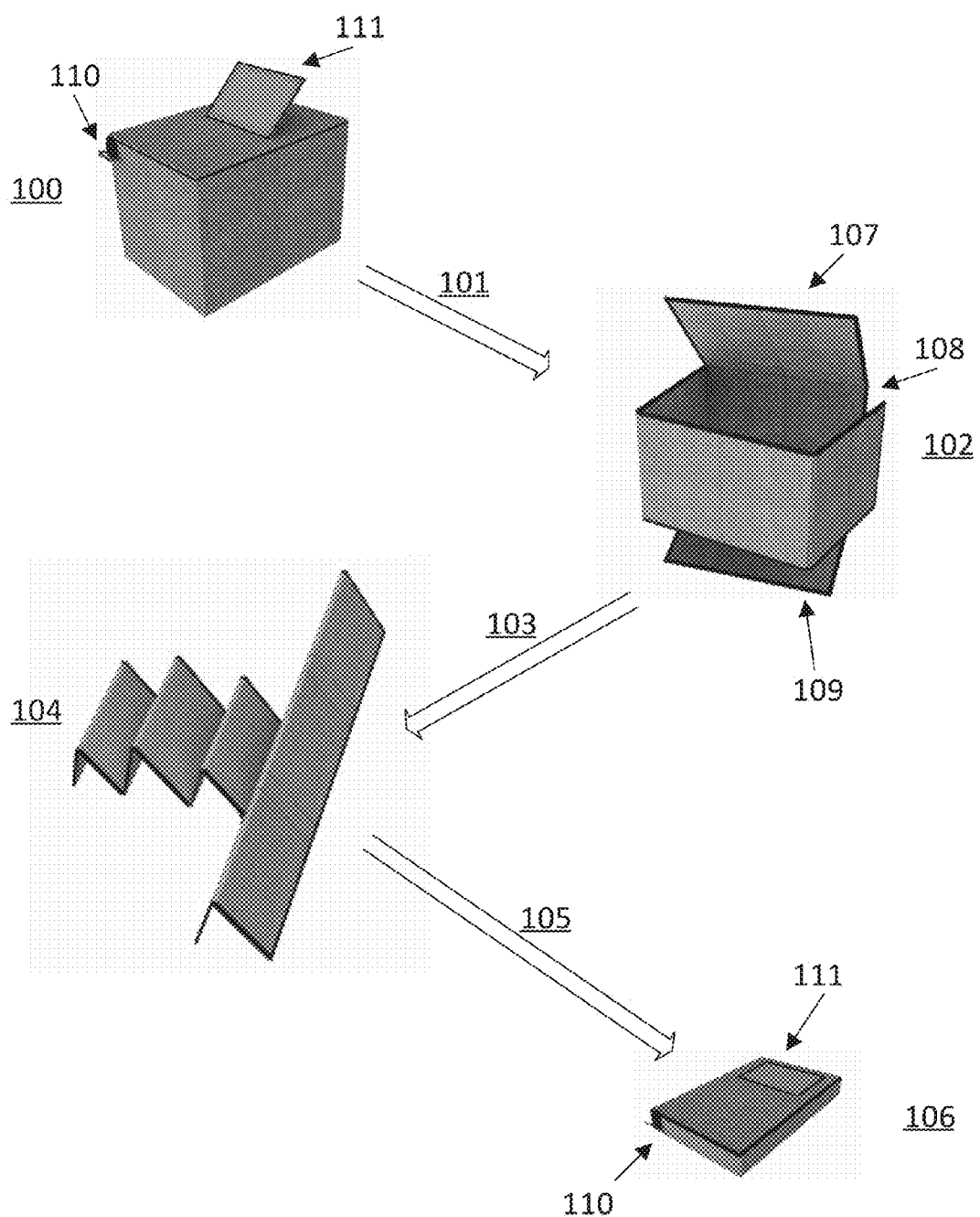
FIG. 1 illustrates a reusable zipper-reconfigurable shipping box transitioning from a shipping box state to a compacted state in accordance with approaches disclosed herein.

FIG. 1 illustrates one example of a reusable zipper-reconfigurable shipping box that executes the transition mentioned above. The box is illustrated in its shipping box state 100, two intermediate states (102, 104), and a compacted state 106. The box includes a set of sides. As illustrated, the sides include a lid that seals the shipping box, a base, and a set of sidewalls. In the case of a traditional cuboid, the set of sidewalls would include a set of four sidewalls.

The first transition 101 involves transitioning the zipper from fully zipped to unzipped. As shown, the same zipper is used to seal lid 107 and to reconfigure the box. In this particular example, the zipper reconfigures the box because it zips down one corner of the box 108 from the lid to the base and secures base 109 to the sidewalls of the box. As such, when the zipper is fully unzipped, the box can be laid flat and takes on a "T" shape where the sidewalls form the vertical portion of the "T" and the lid and base form the horizontal branches. The second transition 103 involves the box being laid flat and then the fold lines of the sidewalls being bent in an accordion fold towards the top sidewall. The third transition 105 into compacted state 106 involves the lid and base being folded over a stack of the sidewalls. In this particular approach, the base is folded over the stack first followed by the lid. One added benefit of this approach is that the same security feature 110 and shipping label area 111 can be utilized in both the shipping box state 100 and the compacted state 106.

The shipping box state 100 of FIG. 1 includes a cavity that is surrounded by the set of sidewalls, the lid 107, and the base 109 in a shipping container state. The cavity is accessible via the lid 107 when the shipping box is open. An item can be placed in the shipping box and the lid can then be shut and sealed with security feature 110 such as a lock attaching the zipper guide to an attachment on the surface of the box near the top stop of the zipper. Security feature 110 can be connected to the zipper in order to detect a breach of the cavity if it is tampered with. The box with the item inside can then be sent through the mail to an address identified by a shipping label in or on shipping label area 111. Upon receipt of the shipping box, a recipient can break or unlock the security feature 110, take the item out of the box, and reconfigure the shipping box to compacted state 106. The cavity is collapsed in compacted state 106 in order to minimize the volume of the box on the return trip. Although the box is empty in the compacted state it can also be secured in order to assure the box remains in the compacted state throughout its return trip.

Numerous features described below can be used in combination with the approach of FIG. 1 or as alternatives to specific features described with reference to FIG. 1. The approach described with reference to FIG. 1 is provided as a detailed example to provide an introduction to certain features described below. For example, although the same zipper is utilized in FIG. 1 to reconfigure the box and to open and close the box in the shipping container state, these two aspects of the shipping box could be conducted using separate fastening devices. The two aspects could be controlled by separate zippers or by a combination of buttons, hook-and-loop fasteners, temporary adhesive, or any other fastener. The remainder of the disclosure is divided into several parts.

Panel Material and Structural Rigidity

A shipping box can include a set of sides. The set of sides can include a lid, a base, and a set of sidewalls. In situations in which the box is a traditional cuboid shape, the set of sidewalls would include four sidewalls. In accordance with approaches disclosed herein, the shipping box could include a set of panels where the lid, each sidewall in the set of sidewalls, and the base could each include at least two panels from this set of panels. Returning to the example of a traditional cuboid, the resulting shipping box would include a set of at least 12 panels.

Each panel of the shipping box could be edged by a combination of fold lines and zipper tracks. Each panel could be rectangular. Every edge of the panel could be either a fold line or a zipper track. For example, in a cuboid shipping box with a lid defined by two panels and permanently affixed to the back sidewall of the shipping box, the two panels that defined the lid could each have two zipper tracks on their top and side edges and two fold lines on their bottom and alternative sides. Structural rigidity could be provided by a selection of the panel material, zipper type, and the manner in which the zipper was affixed to the panel material.

Figure 2:
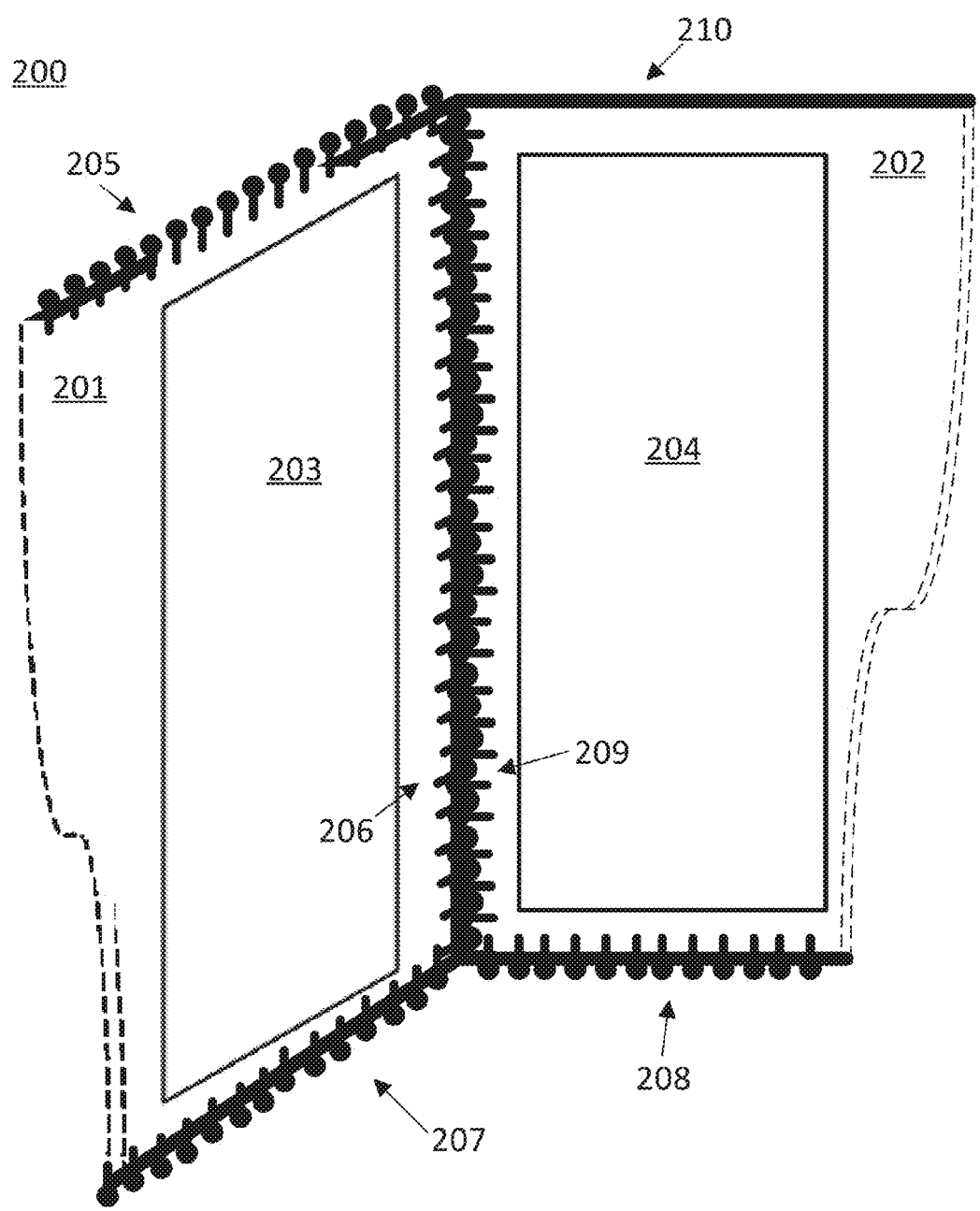
FIG. 2 illustrates a set of sides of a shipping box and the manner in which a zipper and a set of panels each with a rigid member and pliant sheathing layer provide structural rigidity in the shipping box state and facilitate an efficient transition into the compacted state.

FIG. 2 illustrates a corner 200 of a reusable shipping box with two sidewalls 201 and 202. Only portions of the side walls are drawn, with phantom lines indicating where the sidewalls were excised for purposes of illustration. As drawn, sidewalls 201 and 202 could include more than two panels but only two (203, 204) are included in the figure. The panels are edged via zipper tracks 205, 206, 207, 208, and 209. Panel 204 is also edged by a fold line 210. The fold line 210 could be shared with a lid of the shipping box that is bent back around the fold line such that it is not visible in the drawing. Zipper edge 205 could be configured to attach to a zipper edge on the lid of the box. Zipper edges 207 and 208 could be configured to attach to a base of the box. Each panel could also be edged by a fold line with an adjacent panel in sidewall 201 and 202.

Structural rigidity could be provided to the box by panels such as panels 203 and 204 in combination with the zipper that binds them together. The panels could be homogenous rigid members with zipper tracks formed by zipper teeth attached directly to holes punched into the homogenous panels. Alternatively, the zipper teeth could be fused or glued onto the panels. The zipper teeth could alternatively be connected to a strip of zipper tape attached to the homogenous members. The panels could alternatively comprise a rigid member surrounded by a pliant sheathing layer. The pliant sheathing layer is a flexible material that encloses and serves to connect the rigid members. The pliant sheathing layer could be a fabric or thin layer of plastic material. In any of these embodiments, the material for the rigid member could be, for example, a plastic, cardboard or a composite material. The material may have a corrugated configuration, or may be a solid sheet of sufficient thickness to provide the needed structural rigidity. The plastic for the rigid member could be, for example, a thermoplastic polymer such as acrylonitrile butadiene styrene (ABS). The panels 203 and 204 are illustrated as rectangles in FIG. 2; however, in general the panels may have other shapes as needed for various shipping container shapes and folding configurations.

Structural rigidity would be provided by forcing the load bearing rigid members into alignment using the zippers. The panels could be sized such that all of the zippers and fold lines were pulled taut when the zipper was fully zipped. Structural rigidity would thereby be provided due to the tension exerted on opposite edges of each panel. In certain approaches, the zippers could also be configured to force the lid and base to rest on the edges of the sidewall to allow the rigid portions of the sidewall, instead of the load bearing capability of the zipper track itself, to support the box from being crushed from above or below if stacked in the shipping box state with other boxes.

The zipper could pull the panels together as it was zipped. To facilitate the transition, the zipper could be a single zipper running in-between a top and bottom stop, or a double separating zipper running between two end stops. Structural rigidity could also be provided by a mix of fastener types used in combination with the zipper or in the alternative. For example, a subset of panels could be brought into alignment using zippers while another subset utilized straps and buttons, buttons on alternative panels, hook-and-loop fasteners (e.g., Velcro), or any other kind of fastener. As another example, the main zipper track could be augmented by snaps, hook and loop straps, or other fasteners capable of being wrapped over the main zipper track. In addition certain fasteners could be connected between panels to temporarily hold a subset of panels in a particular configuration in order to facilitate a rapid movement of the zipper along the zipper track. For example, a Velcro strap could be used to place the first sidewall with the end stop of the zipper track on its edge with the base so that the first edge could be aligned before a person used their hands to begin zipping the box.

Zipper Configuration

The manner in which the shipping box transitions between the shipping box state and the compacted state is influenced by the position of the zipper relative to the sides and panels of the shipping box. As stated previously, when the zipper is fully unzipped it can allow the shipping box to be folded into the compacted state, and when it is not fully unzipped it can prevent the shipping box from being folded into the compacted state. Generally, the configuration of the zipper and folding pattern are selected to assure that both the maximum cross section size and the volume of the compacted state are less than in the shipping box state. This can be achieved by having certain sides of the shipping box comprise multiple panels that can be folded over themselves.

The zipper can run along various edges of the sides or panels of the shipping box including along tracks that are in line with the edges of the sides or in diagonal lines across the sides. In shipping boxes in which at least two sidewalls share a set of zipper teeth that form a zipper track in combination, the zipper can run down from the lid to the base between two sidewalls of the set of sidewalls that comprise the shipping box in order to allow for the transition between a compacted and shipping box state. Alternatively or in combination, a shipping box can have a side that is bisected by a zipper track such that the zipper zips diagonally across one of the sides. In combination, the same zipper track can run from the lid to the base between two sidewalls and then immediately run diagonally across the base. Alternatively the sidewalls will not include zipper tracks on their side edges, and the base will have a separate zipper running diagonally from one corner to the other that allows the shipping box to transition between a compacted and shipping box state.

Figure 3:
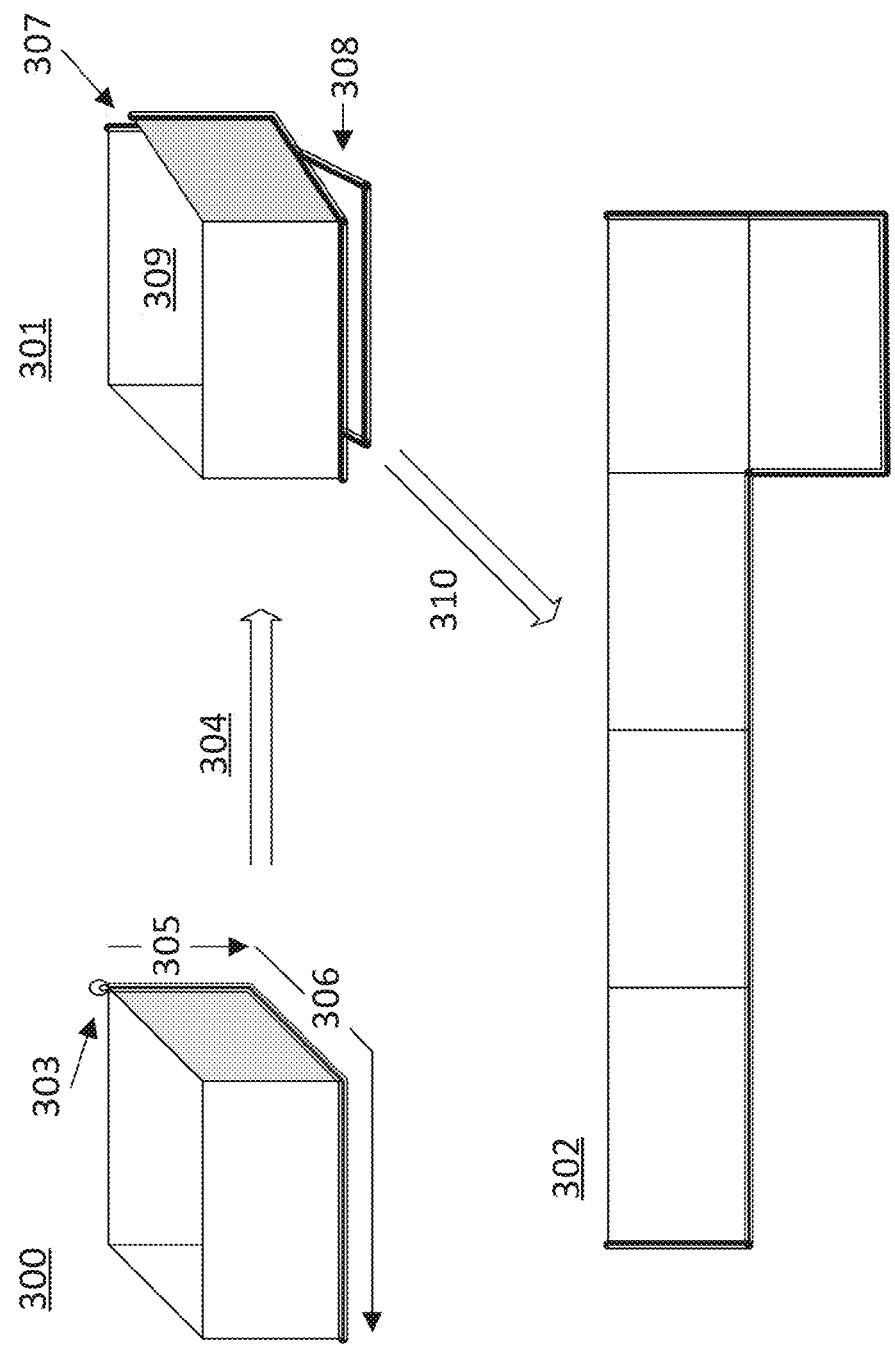
FIG. 3 illustrates a shipping box at different states as it transitions between a shipping box state and a compacted state using a corner zip zipper configuration.

A corner zip configuration for the zipper can be described with reference to FIG. 3 in which a shipping box is shown in three states 300, 301, and 302. State 300 shows the shipping box in a shipping container state with the lid removed from the figure to illustrate the operation of the corner zip configuration in isolation. In specific approaches, the lid will be a separate piece and can be disposed of or folded into the compacted state. In other approaches, the lid will be permanently secured to one of the sidewalls. Such a lid can be releasably attached to the other three sidewalls using a zipper, straps, buttons, or any other fastening device that can be conveniently released and refixed. The lid can be secured to the other three sidewalls using the same zipper that allows for reconfiguration of the state of the shipping box as described below in FIG. 4. However, in certain approaches zipper 303 will not be used to secure the lid and will only be accessible from inside the box to prevent someone from having access to the zipper guide from the outside of the box. Such a configuration increases the options available for tamper sealing the lid as will be described in a later section.

Zipper 303 is fully zipped in state 300. Transition 304 involves the zipper being fully unzipped. This process includes moving the zipper guide down from the lid to the base between two adjacent sidewalls in the set of four sidewalls. This path is marked by reference numeral 305 in FIG. 3. This process also includes moving the zipper guide all the way around three out of four edges of the base along zipper path 306 in FIG. 3. In other approaches, such as those in which the base is detachable, this transition could involve moving the zipper guide all the way around all four edges of the base and freeing the base completely. As in approaches in which the lid is detachable, the detachable base could be disposable or separately foldable into the compacted state of the shipping box.

State 301 is an intermediate state in which the zipper has been fully unzipped. As illustrated, the sidewalls no longer form an enclosing continuous connected chain and have been separated at corner 307. In addition, the base 308 is now only connected to sidewall 309. As such, the shipping box can be laid down flat as in transition 310 leading to state 302 in which the shipping box can be folded into the compacted state.

Figure 4:
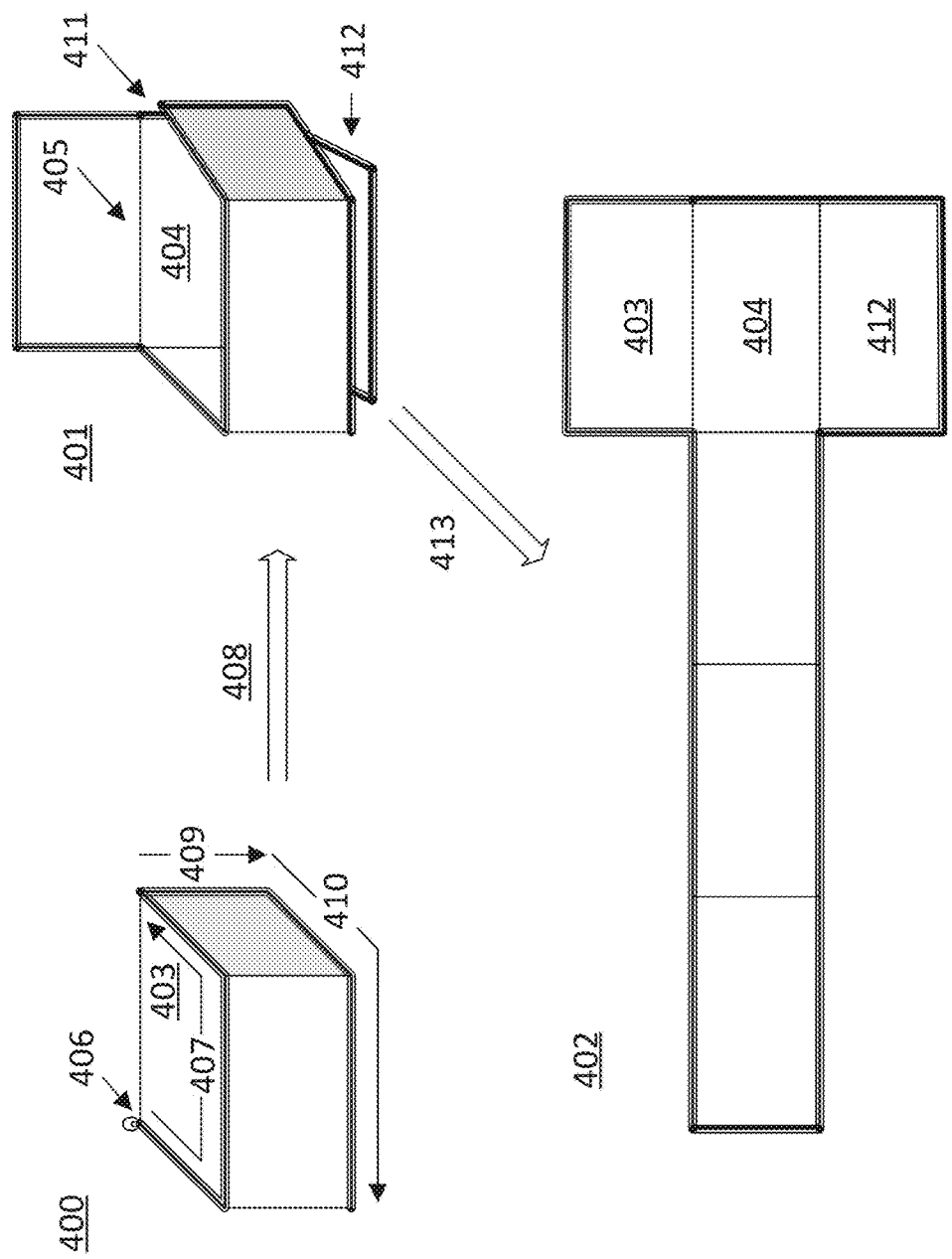
FIG. 4 illustrates a shipping box at different states as it transitions between a shipping box state and a compacted state using a corner zip with one zip zipper configuration.

A one zip corner zip configuration for the zipper can be described with reference to FIG. 4 in which a shipping box is shown in three states 400, 401, and 402. The shipping box in FIG. 4 differs from the shipping box from FIG. 3 in that a single zipper both secures the lid to the sidewalls of the shipping box in the shipping container state, and allows the shipping box to alter its configuration between the shipping container state and the compacted state. Lid 403 is permanently secured to the back sidewall 404 and is separated from back sidewall 404 by a fold line 405. The lid 403 is permanently secured via stitching, welding, or some other fastening method that is not meant to be repeatedly reversed. The lid could also be attached to all four of the sidewalls using the same zipper and could be disposable or could be included in the compacted state as a separate but secured piece.

Zipper 406 is fully zipped in state 400. As such, lid 403 seals the lid to a subset of three sidewalls in the set of sidewalls when it is fully zipped. When zipper 406 is not fully unzipped it prevents the shipping box from transitioning into the compacted state. Zipper 406 allows the shipping box to be folded into the compacted state when it is fully unzipped. For example, zipper 406 prevents the shipping box from being folded into the compacted state when it is half way zipped, and provides significant structural rigidity to the box even when the lid has been unsecured by moving the zipper along zipper path 407.

Transition 408 involves the zipper being fully unzipped. This process includes moving the zipper guide around three sides of the lid and then down from the lid to the base between two adjacent sidewalls in the set of four sidewalls. This path is marked by reference numerals 407 and 409 in FIG. 4. This process also includes moving the zipper guide all the way around three out of four edges of the base along zipper path 410 in FIG. 4. In other approaches, such as those in which the base is detachable, this transition could involve moving the zipper guide all the way around all four edges of the base and freeing the base completely. As in approaches in which the lid is detachable, the detachable base could be disposable or separately foldable into the compacted state of the shipping box.

State 401 is an intermediate state in which the zipper has been fully unzipped. As illustrated, the sidewalls no longer form an enclosing continuous connected chain and have been separated at corner 411. In addition, the base 412 is now only connected to sidewall 404. As such, the shipping box can be laid down flat as in transition 413 leading to state 402 in which the shipping box can be folded into the compacted state. In contrast to the shipping box of FIG. 4, zipper 406 extends around the entire periphery of the shipping box when it is in state 402. As drawn, the entire shipping box is a single unitary piece when the zipper is open and when the zipper is closed. This is not an artifact of the one zip design as even in situations in which the lid of the shipping box in FIG. 3 was secured by snaps or alternatives fasteners, the shipping box could still be a single unitary piece in either state. However, the one zip design has a further advantage in that the entire unitary piece of the design can be secured by a single zipper for added convenience.

Figure 5:
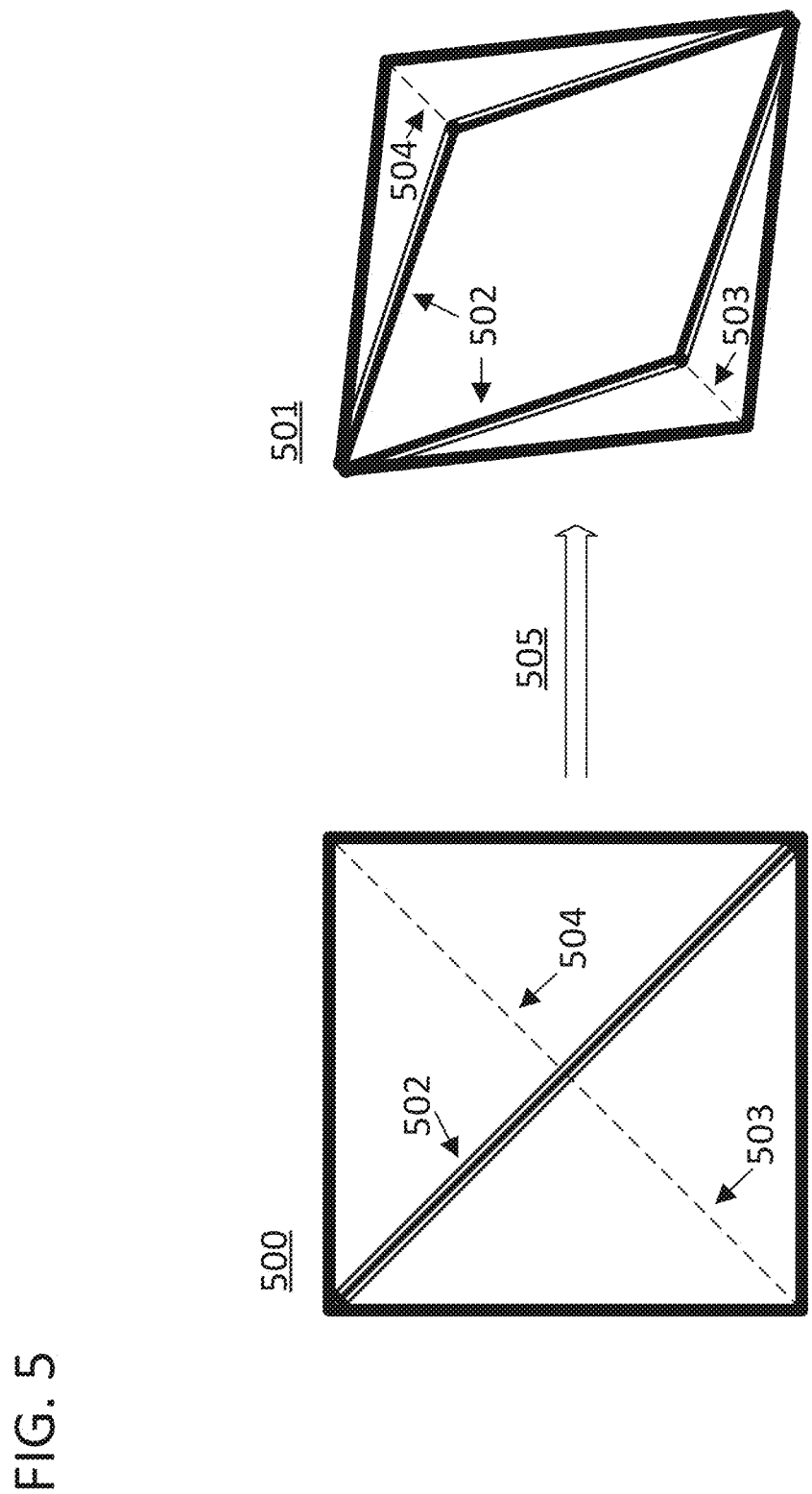
FIG. 5 illustrates a shipping box at different states as it transitions between a shipping box state and a compacted state using a diagonal zip zipper configuration.

A diagonal zip configuration for the zipper can be described with reference to FIG. 5 in which a shipping box is shown in two states 500 and 501. FIG. 5 illustrates the shipping box in a plan view with the lid removed so that the view is directly down at the base of the box. As seen, a zipper track 502 runs from one corner of the base to an opposite corner in a diagonal direction. However, it should be noted that the diagonal track could allow the zipper to zip diagonally across any of the sides of the box FIG. 5 to produce a similar effect so long as the opposing side of the box was not being held rigid by fold lines, closed zippers, or a combination thereof. For example, two opposing sidewalls of the box could include diagonal zipper tracks that, when unzipped, allow the box to collapse into a compacted state.

State 500 shows the shipping box with the zipper closed so that the shipping container state is maintained. As shown, the base of the box includes a zipper track that zips diagonally across the base. The zipper is closed in the shipping container state. The base also includes a first fold line 503 and a second fold line 504. The first and second fold lines 503 and 504 are normal to the diagonal path of zipper track 502. The first fold line extends from the diagonal path to a first corner of the base. The second fold line extends from the diagonal path to a second corner of the base. Transition 505 involves the zipper being opened by moving the zipper guide along zipper track 502. State 501 shows the result of zipper track 502 being split and the resulting two halves of the base being lifted up through the center of the box with the base folding along fold line 503 and 504 in the process. As illustrated, the material in the sides of the box could be selected so that fold lines 503 and 504 were one-way fold lines that would not buckle under the weight of an item placed in the box.

The approach in FIG. 5 can be combined with different aspects of the configurations described with reference to FIGS. 3 and 4. The diagonal zip approach can be used in combination with the corner zip approach. In that combination, the zipper could zip down from the lid to the base between two adjacent sidewalls and then zip across a diagonal path through the base. The diagonal zip approach could also be used in combination with the one zip approach. In that combination, the zipper could zip around the periphery of the lid, down from the lid to the base between two adjacent sidewalls and then zip across a diagonal path through the base. The diagonal zip approach can be beneficially applied when the diagonal zipper track 502 is shorter than or equal to the height of the shipping box. In that situation, pulling the base up towards the top of the box as in transition 505 would not result in excess material rising above the plane defined by the top edge of the sidewalls.

Figure 6:
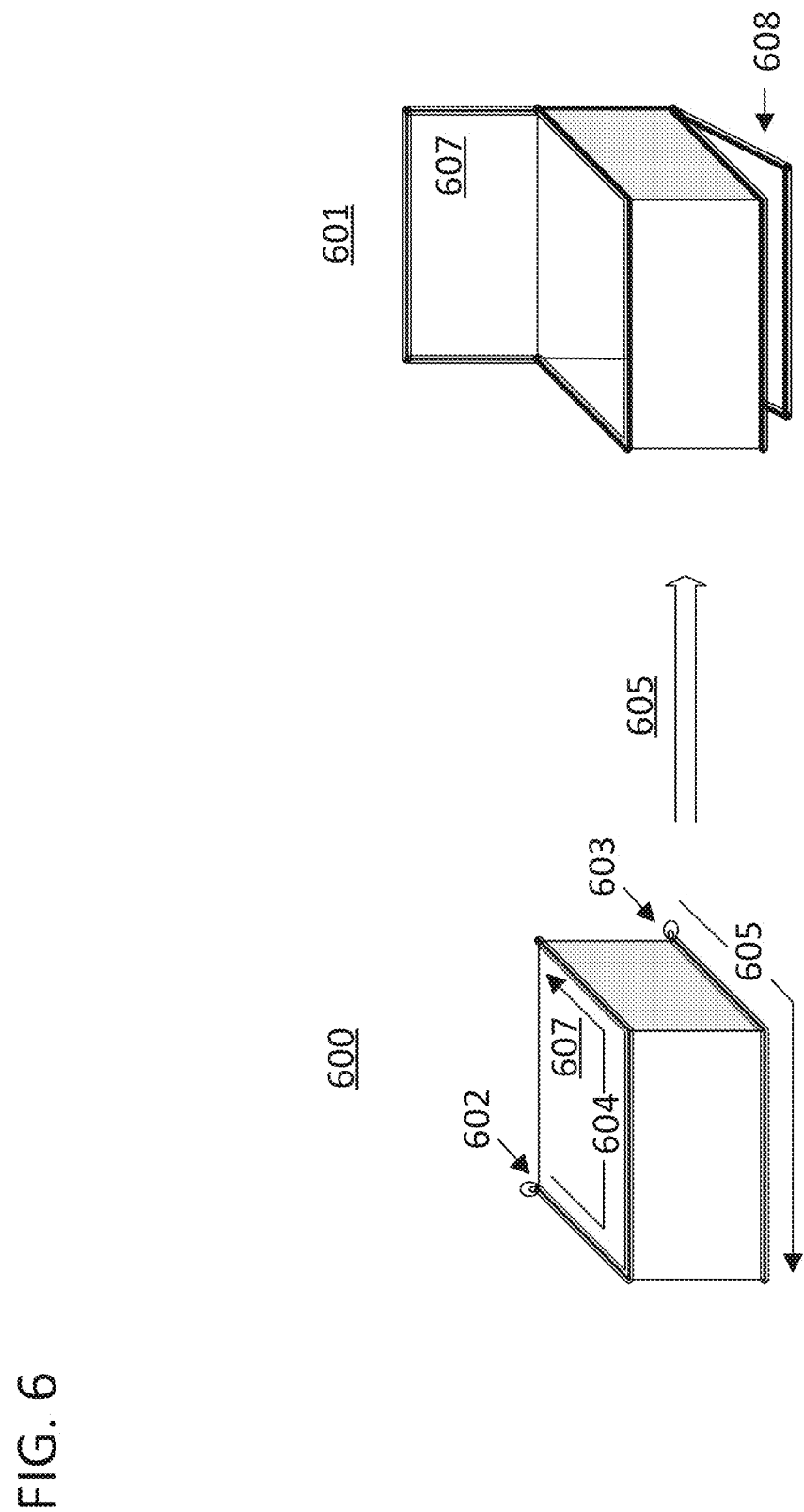
FIG. 6 illustrates a shipping box at different states as it transitions between a shipping box state and a compacted state using a two zip zipper configuration.

A two zip configuration for the zipper can be described with reference to FIG. 6 in which a shipping box is shown in two states 600 and 601. The two zip configuration includes a first zipper 602 and a second zipper 603. First zipper 601 secures lid 607 to the top edge of three out of four of the sidewalls of the box when it is fully zipped. Second zipper 603 secures base 608 to the bottom edge of three out of four of the sidewalls of the box when it is fully zipped. The fourth sidewall is attached to the base and the lid with a permanent attachment along the top and bottom edge. The lid and base could alternatively be attached to different sidewalls. Both the lid and the base can also be attached to four out of four sidewalls via a zipper. The lid and base can be disposable in these configurations or could be stored with the shipping box in a compacted state as separate pieces. Transition 605 involves zippers 602 and 603 being unzipped along zipper tracks 604 and 605 where zipper track 605 includes another turn around the edge of the shipping box that is not visible in the illustration. Once the zippers have been fully unzipped the shipping box can be laid flat and folded into a compacted state.

Folding Patterns

The folding pattern used to transition the box to the compacted state once the zipper is unzipped will depend on the specific zipper configuration utilized, relative dimensions of the box, and the presence or absence of detachable sides. In the case of a cuboid, the dimensions will be the depth, height, and width of the box. As mentioned above specific sets of dimensions can be selected so that the sides of the box fold evenly. However, as described below, multi-panel configurations can be utilized where certain panels are used as gussets during the folding process to achieve uniform folding where single panel sides would lead to irregular or difficult folding shapes. Multi-panel configurations also generally provide the ability to reduce the maximum cross section of the box between the shipping box state and compacted state. The folding patterns generally follow the principle of collapsing the cavity used to store an item in the shipping box state and having a point on a first side of the box in contact with a point on a second side of the box in the compacted state, such points not being on the edges of the sides and not being in contact when the box is in the shipping box state.

Figure 7:
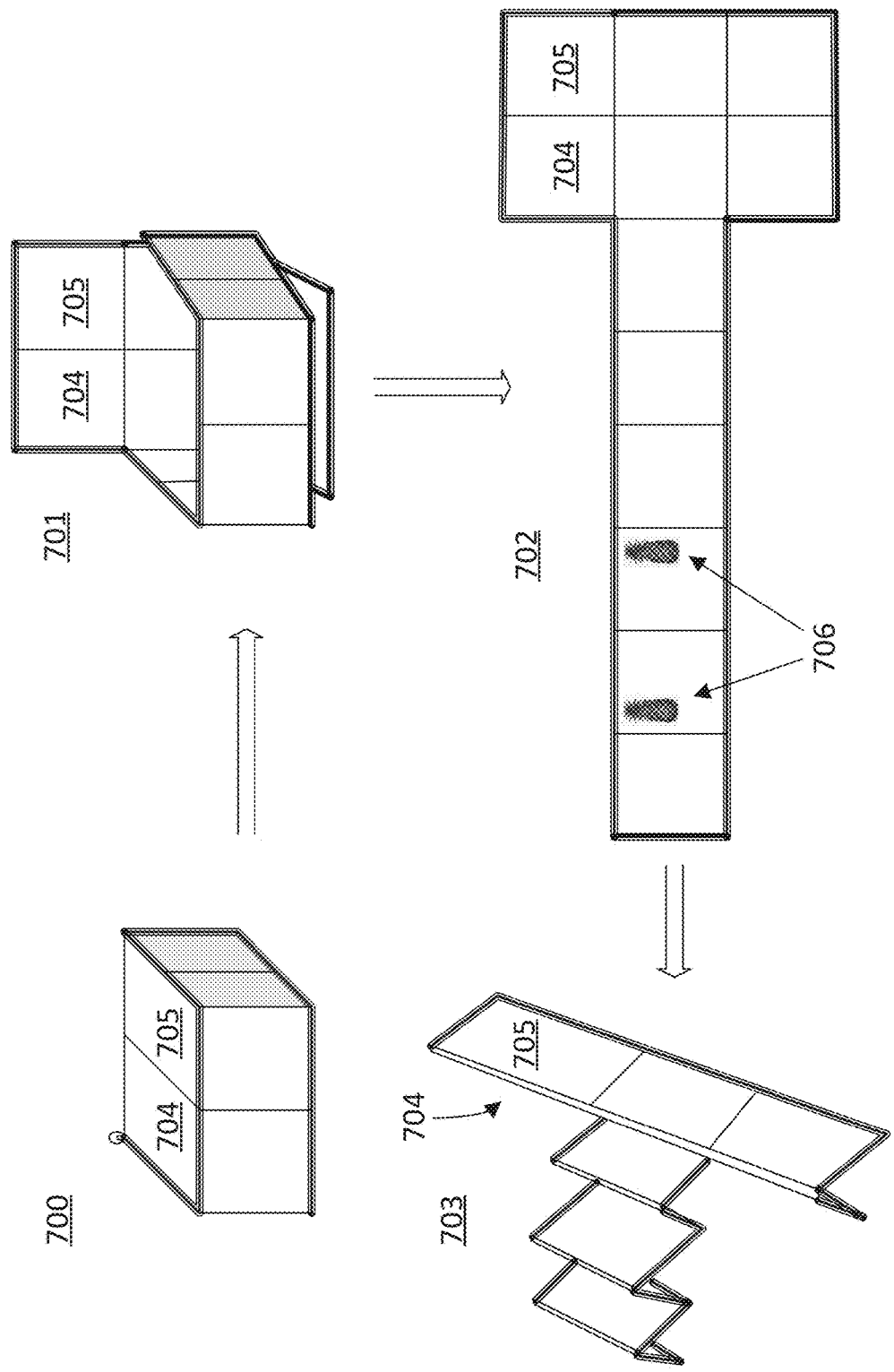
FIG. 7 illustrates a shipping box with a set of sides where each side includes at least two panels as it transitions between a shipping box state and a compacted state.

FIG. 7 illustrates a shipping box in four states 700, 701, 702, and 703 transitioning between a shipping box state and a compacted state. As illustrated, the shipping box includes a set of panels, where each of the sides of the shipping box includes two panels. As illustrated, the lid, each sidewall, and the base each include at least two panels from that set of panels. For example, the lid includes a first panel 704 and a second panel 705. In the illustrated example, the shipping box uses a one zip corner zip zipper configuration and does not include any detachable sides. As a result, the entire box is a single unitary piece and all of the panels are separated from at least one other panel via a fold line. As seen in state 702 when the box is laid flat, each edge of each panel is either a zipper edge or a fold line. In addition, and as seen in state 703, the fold lines of the side walls are all parallel to each other. The panels can each comprise rigid members surrounded by pliant sheathing layers and can generally take on the characteristics of panels 203 and 204 described above in FIG. 2. Specifically, the zipper edge could include a zipper tape extension connected to the pliant sheathing layer and have one set of zipper teeth or could have zipper teeth directly attached to the material forming the rigid member.

Folding patterns that are conducted on boxes where each side comprises at least two panels provide the benefit of decreasing the maximum cross section of the shipping box between the shipping box state and the compacted state. This benefit is also realized by approaches in which the largest sides of the shipping box comprise at least two panels. These approaches can be referred to as multi-panel folding patterns. Approaches in which every side of the box is multi-panel can be referred to as a fully multi-panel approach.

Multi-panel approaches reduce the cost of sending a shipping box in the compacted state through the mail as the maximum cross section of an item is strongly correlated with the cost of shipment. The use of multiple panels therefore allows for a large transformation between maximum volume of the shipping box cavity in the shipping box state and minimum volume and cross sectional area in the compacted state. In the case of a cuboid shipping box, shipping boxes with a compacted state having a number of panels in a folded stack greater than 6 tend to exhibit this benefit.

Figure 8:
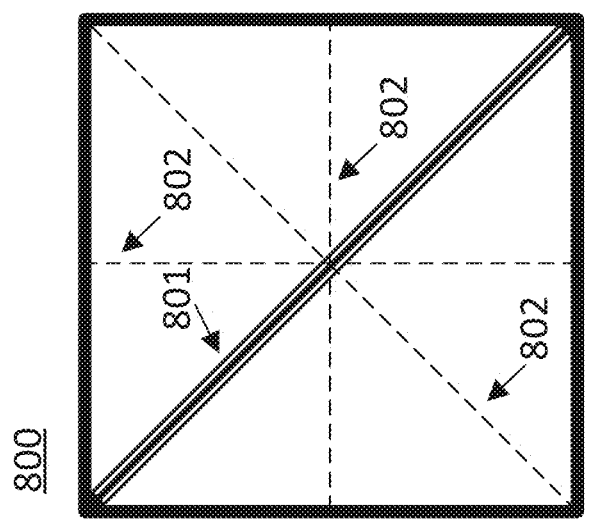
FIG. 8 illustrates a shipping box using a diagonal zip zipper configuration with multi-panel sidewalls.

Although FIG. 7 illustrates a multi-panel folding pattern using a one zip corner zip configuration, multi-panel approaches can be combined with any zipper configuration including the diagonal zip, two zip, and corner zip approaches. In particular, diagonal zip zipper configurations in which the largest side is bisected by a diagonal zipper track are inherently multi-panel approaches. Furthermore, a diagonal zip approach with a cuboid box combined with a fully multi-panel approach produces certain additional appreciable benefits. In these approaches, the lid and each of the four sidewalls each include at least two panels from a set of panels. The base can include eight panels from the set of panels. Each panel in the set of panels is separated from at least one other panel in the set of panels by a fold line. When the diagonal zipper track has been released and the base is pulled up towards the lid of the box, the resulting two halves of the base can be folded upon themselves three times along with the corner of the box, and the two fold lines on each side of the box to which they are permanently attached. This approach can be combined with one in which, as illustrated in FIG. 8, half the diagonal of the base is equal to the height of the box and the base 800 is bisected by the zipper track 801 and the set of fold lines 802.

Figure 9:
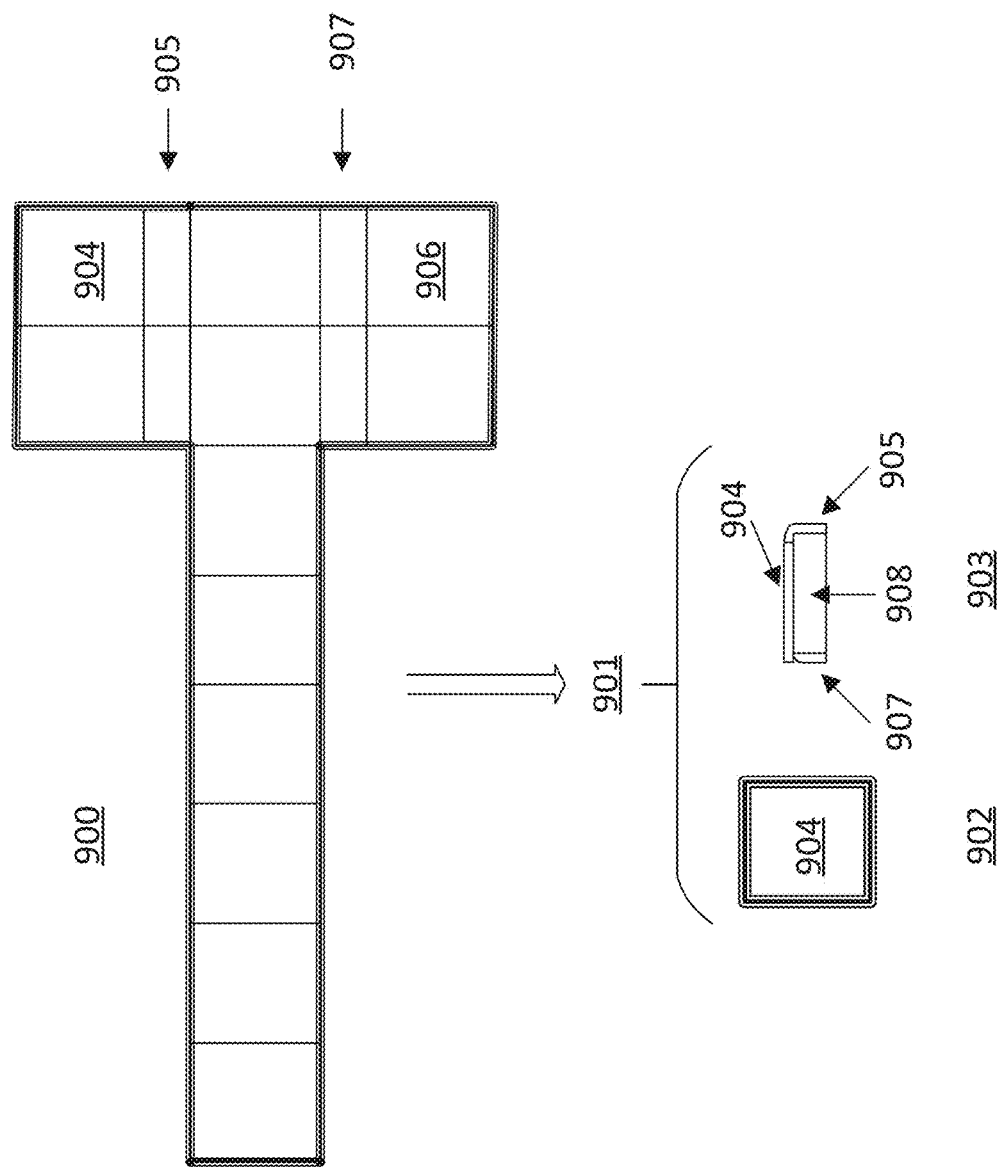
FIG. 9 illustrates a shipping box at different states as it transitions between a shipping box state and a compacted state using gussets to facilitate a folding pattern.

The folding pattern of the box can be assisted by gussets. The gussets can be panels in a set of panels defining a side of the shipping box. FIG. 9 illustrates a shipping box in a laid flat state 900 and a compacted state 901. Compacted state 901 is illustrated by a plan view 902 and a side view 903. State 900 shows one of the panels of the lid 904 connected to a sidewall via a gusset 905 and one of the panels of the base 906 connected to the same sidewall via a second gusset 907. In the transition to 901, all of the sidewalls are folded over each other, and the base and lid are folded over themselves once by folding along all of the inter-panel fold lines that are illustrated in the figure in an accordion fashion. The resulting stack 908, shown in side view 903, is as high as twice the thickness of the sidewalls. The lid and base could then be folded back over the fold lines that separate them from their common sidewall in the opposite direction from the accordion stack. However, with the addition of gussets 905 and 907, the base and lid can be folded up and over the stack and can be used to secure the accordion fold in place in the compacted state as shown in side view 903. The resulting compacted state only needs to have a fastening feature to keep panel 904 in place in order to keep all of the panels secure in the compacted state. The resulting compacted state also has a minimal maximum cross section which is roughly equivalent to the cross section of an individual panel 904.

The folding pattern of the shipping box will beneficially be intuitive to the person that needs to transfer the shipping box into the compacted state. As the shipping box will often be sent to a customer that may not have had previous experience with the shipping box, an intuitive transition increases the likelihood that the customer will be willing to contribute to the reusability process instead of discarding the shipping box or opting for disposable shipping materials in the future. In addition to the use of intuitive folding patterns, the customer can also be aided by being presented with icons on various sides of the shipping box that should be matched together. Using the one zip corner zip multi-panel configuration of FIG. 7 as an example, a pineapple icon 706 could be placed on specific sides of specific panels to instruct a user to place those panels into contact during the folding process. The icons could also be numbers to help describe the chronological order in which the folds should occur. The icons could be placed on the interior sides of the box so as to not be visible in the shipping container state. Alternatively, the icons could be used as part of a branding campaign to make the boxes more distinct or promote the trademarks of the company utilizing the shipping box.

One benefit of the approaches disclosed above is that there is generally less of a need for baffles or any form of edge augmentation to assist the transition between the shipping container state and the compacted state. As shown in FIG. 7, each edge of each panel is either a zipper edge or a fold line directly connected to another panel. In particular, since the shipping box will spend the great majority of its time in the shipping container or compacted states, and is only temporarily in any intermediate transition step, there is no need to augment the edges with strengthening materials to prevent the box from being torn at any concave edges that are temporarily exposed during the transition between the compacted and shipping container state. Generally, to increase the durability of the shipping box for transmission through the mail, both the shipping container and compacted states will not present any concave edges to the exterior of the shipping container. Certain edges of the box can be augmented by Velcro attachments or other fastening devices spanning from one side to the other to increase the structural integrity of the box but they generally are not necessary if the zipper is sufficiently strong. In addition, Velcro attachments or other fastening devices such as magnetic tethers can span edges for purposes of temporarily aligning the zipper track to assist the actual process of moving the zipper guide from the fully unzipped to zipped position.

In situations in which the shipping box has detachable sides or individual panels such as a detachable lid, base, or part thereof, the folding pattern can include a method for storing the detachable side in a secure fashion for transmission through the mail. For example, the detachable sides or individual panels could be placed in the center of the shipping box when it is laid flat and be surrounded by the remaining panels as they are folded in and over the individual panels before being secured. Alternatively or in combination the detachable panels can be secured to the remainder of the shipping box using Velcro or some other form of fashioning material.

State Retention in Shipping Box and Compacted States

The shipping box can be secured in both the compacted state and the shipping box state. In the shipping box state the box is secured in the sense that the contents of the box cannot be accessed without providing some evidence of a breach of the shipping box. To this end, a security feature can be connected to the zipper to detect a breach of the cavity. The shipping box is secured in the compacted state in the sense that the shipping box retains its shape to make the box easier to move through the mail and less likely to be damaged as it is transported through the mail. In certain approaches, the same mechanism is used to secure the box in both states. However, in certain approaches, different specialized mechanisms are used to secure the box in the shipping box state and the compacted state.

The security feature can connect a zipper slider of the zipper that reconfigures the shipping box to a fixed point on the reusable shipping box proximate a bottom stop of the zipper. The security feature can include both an element for resistance to forced entry to the cavity of the shipping box and a tamper indicator. The tamper indicator can also be referred to as a breach of package indicator. The security feature could include one or more of a combination barrel lock, a mechanical key lock, a zip tie, tamper evident tapes and seals, or paper tabs or an electromechanical NFC-responsive lock. The security feature could extend through the zipper slider and a grommet or D-ring located on a fixed point on the reusable shipping box.

Figure 10:
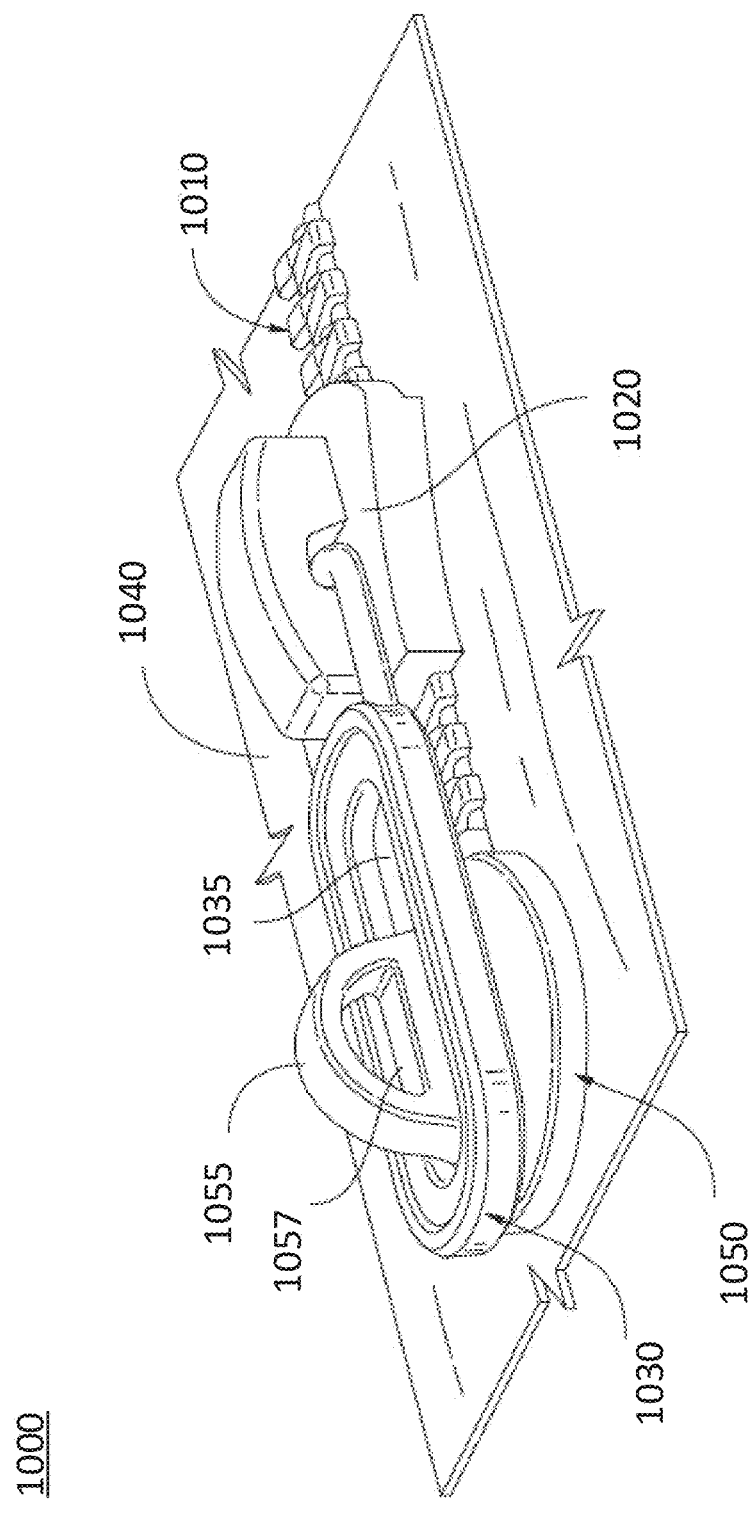
FIG. 10 illustrates a security device for maintaining the state of the shipping box.

FIG. 10 is a perspective view of a locking device 1000 that could serve as a part of the security feature for the shipping boxes described above. Locking device 1000 has a zipper track 1010, a zipper head 1020 and zipper pull 1030. Zipper pull 1030 has a slot 1035 through which the head 1055 of rivet 1050 is placed in order to be locked. Rivet 1050 can serve as the bottom stop of zipper track 1010. Rivet 1050 is, for example, a fabric rivet that is mounted to the shipping container material 1040 at the end of the closed zipper 1010. The rivet could also be attached to a zipper tape extension of zipper 1010. The customized head 1055 has an aperture 1057 through which a securing device may be placed to prevent an intruder from unzipping the zipper 1010. The securing device (not shown) may be, for example, a zip tie, a mechanical combination of key lock, or an NFC responsive electromechanical lock that is inserted through aperture 1057 and over zipper pull 1030. If using a combination lock, the sender may communicate the combination for the lock to the recipient via, for example, an email or text message.

The shipping box can also be secured in the compacted state. The shipping box can be secured using one or more fastening devices. The fastening device or devices could each be integrated with the shipping box and could specifically be integrated with two separate portions of the shipping box to keep those points in contact or close proximity and thereby maintain the shipping box in the compacted state. The shipping box can be secured by implementing a specific folding pattern that allowed a portion of the box to wrap around the rest. For example, in the approach outlined with respect to FIG. 9, panel 904 would need to be secured to gusset 907 on the left side of side view 903 using some form of fastening device, and as a result, a single fastening device could preserve the shipping box in its compacted state. However, the shipping box could be secured in the compacted state regardless of the folding pattern using any number of fastening devices. The fastening device could be one or more of Velcro, buttons, straps, magnets, clips, pins, or any other fastening device. The fastening devices could be integrated with and permanently connected to the shipping box so that they could not be misplaced.

The shipping box could also be secured in the compacted state using a stuff sack. The stuff stack could be integrated with or fixed to the shipping box. For example, the stuff sack could be stitched or fused to the base of the shipping box on the interior surface of the shipping box. The stuff sack could be located in the cavity of the shipping box when the shipping box was in the shipping container state. The stuff sack could store the reusable shipping box in the compacted state and could be inverted in a transition between the compacted state. The stuff sack could be secured using Velcro or buttons when the box was in the shipping box state. It could also be pushed into a recessed portion of the panel or panels comprising the base of the shipping box so that the base still presented a uniform surface to the cavity of the shipping box. The stuff sack could be unsecured during the transition of the shipping box from the shipping box to compacted states. After being unsecured, the stuff sack could be turned inside out during the process of securing the remained of the shipping box. This action could include stuffing the folded stack of material comprising the folded shipping box into the stuff sack. The stuff sack could be sealed using any kind of fastening device once the shipping container was placed inside. For example, the stuff sack could include another zipper to keep it sealed or any of the security features described above.

Figure 11:
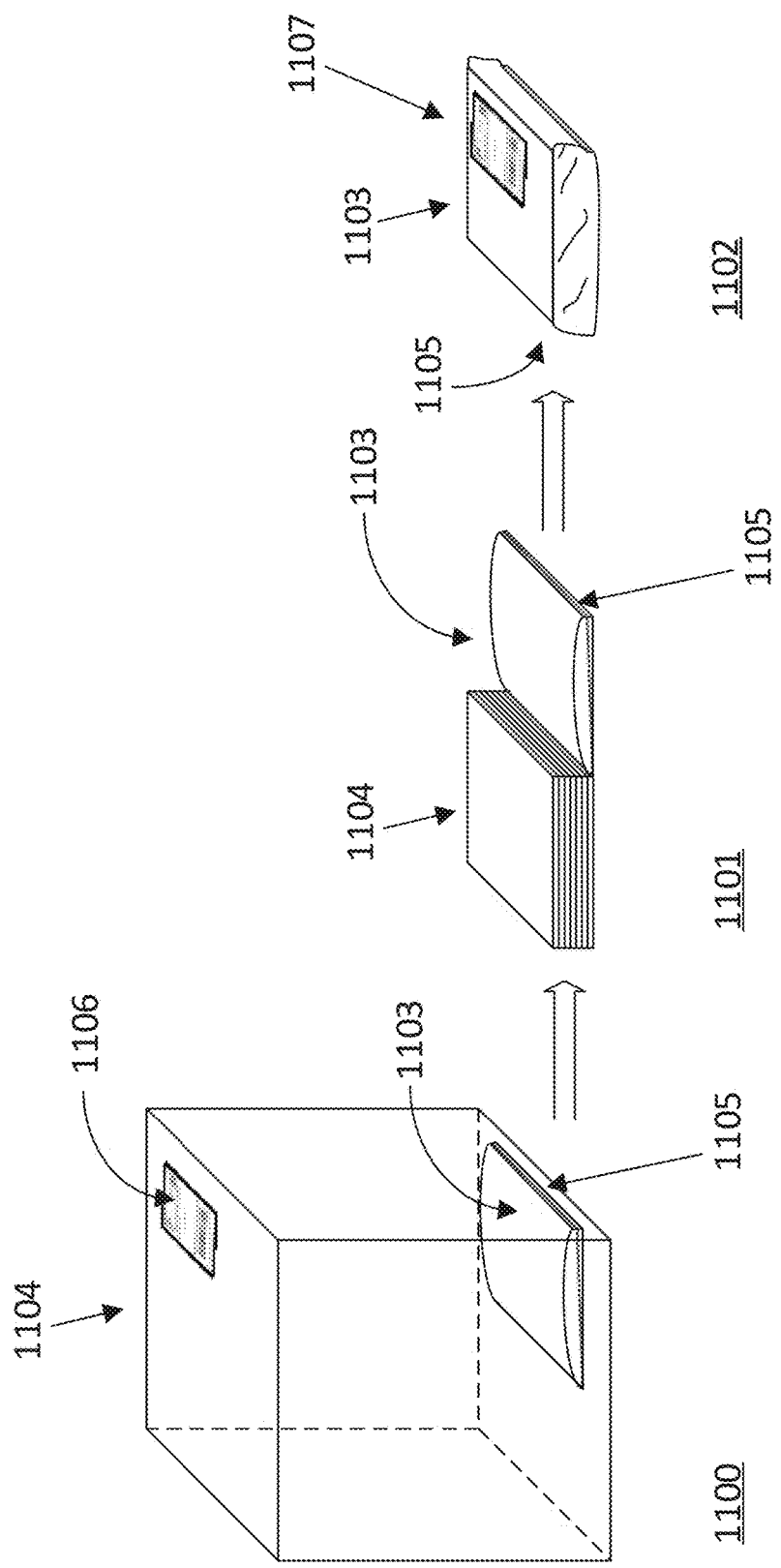
FIG. 11 illustrates a shipping box at different states as it transitions between a shipping box state and a compacted state using an integrated stuff sack.

FIG. 11 illustrates the action of an integrated stuff sack being inverted in a transition from the shipping box state to the compacted state. The shipping box is shown in three states 1100, 1101, and 1102. The shipping box state is state 1100 and the compacted state is state 1102. State 1101 is an intermediate state in which the remainder of the shipping box has been folded, but has not yet been placed in the integrated stuff sack.

In state 1100, the integrated stuff sack 1103 is in the cavity formed by the remainder of shipping box 1104. In this state integrated stuff sack 1103 is fixed to the base of the shipping box on one end and includes a zipper 1105 on the other sides of the stuff sack. In other words, zipper 1105 extends around three sides of the integrated stuff sack, and the fourth side is fixed to the box. In state 1101, the shipping box is folded up in a stack ready to be placed inside the stuff sack. The transition from state 1101 to state 1102 would involve unzipping the zipper and inverting the stuff sack back over the stack of material the is the now-reconfigured remainder of shipping box 1104.

In state 1102, the stuff sack has been inverted and zipper 1105 is zipped on the opposite side of the stack of material that comprises the remainder of shipping box 1104. To facilitate resealing zipper 1105, the zipper guide for zipper 1105 could be double sided. Once the zipper is resealed, the shipping container is secured in its compacted state. The zipper can be locked using a security feature to assure that it is not opened and remains securely closed for its trip through the mail. This approach is beneficial in that the shipping box has wholly different exterior surfaces in the compacted and shipping container state so that wear is distributed more evenly between the two states.

The security feature that secures the box in the shipping container and compacted state could utilize some of the same hardware in both states. For example, and with reference back to FIG. 11, the integrated stuff sack could be fixed to a specific point on the shipping container in close proximity to a bottom stop of the zipper that seals the shipping box close in the shipping container state. In this approach, the same catch on the shipping box could connect a breach detector in the compacted state and the shipping box state. For example, a zip tie could connect zipper 1105 to the catch in state 1102 and the zipper that kept the box sealed in state 1100 could be connected to the catch with a zip tie in state 1100. As another example, and with reference back to FIG. 7, the zipper guide of the zipper used to reconfigure the shipping box could be connected to a catch on a side of the shipping container using a breach detector in state 700. Then, based on the folding pattern for the shipping container, the same zipper guide could end up in close proximity to the same catch using the same breach detector or a different breach detector to maintain the shipping container in the compacted state. The breach detector could be any of the security features mentioned above. For example, a combination lock could keep the shipping box sealed in the shipping container state, be unlocked while the contents of the box were removed and the box was transitioned to the compacted state, and then reconnected to the zipper guide and keep the box secured in the compacted state.

Shipping Labels

As the shipping box is meant to be sent through the mail in both the shipping box and compacted state, shipping labels may need to be affixed to the shipping box in both states. To this end, both states of the shipping box could exhibit one or more shipping label areas. The shipping labels required for both legs of the journey could be provided and affixed to the one or more shipping label areas by the original sender of the shipping box so that the recipient would not need to be bothered by having to print out and attach a shipping label before sending the shipping box back through the mail. Increasing the convenience of the return trip in this manner will increase adoption of the reusable box by consumers.

The shipping label areas will be amenable to the easy addition of shipping labels to the box. The shipping label areas could also be amenable to the controlled removal of the shipping labels to facilitate reuse of the shipping box. Although an adhesive shipping label could generally be affixed to any exterior surface of the shipping box in either the compacted or shipping box state, certain benefits accrue to approaches that utilize specialized shipping label areas in terms of both consumer convenience and reusability. The shipping label areas could be as simple as a separate swatch of material grafted onto the surface of the shipping box or attached thereto. The material could be designed to allow for solid adherence to the adhesive back of standard shipping labels and the easy removal thereof. For example, a thin layer of plastic would not be desirable as the target for the adhesive because repeated removal of shipping label stickers could tear the plastic and would not represent a durable solution. The shipping label area could also be a more complex structure such as a built-in sleeve with a transparent cover. The shipping label area could also be a pocket with a transparent cover and a flap to seal the shipping label in. The flap could be secured using any fastening device such as a button, Velcro, or a zipper.

The shipping box could include a first shipping label area integrated with an exterior surface of the reusable shipping box when the reusable shipping box is in the shipping container state, and a second shipping label area integrated with a second exterior surface of the reusable shipping box when the reusable shipping box is in the compacted state. In other approaches, the same shipping label area could be used in both configurations. The shipping label area may be double sided in these situations such that it could hold a shipping label on either side. This approach would be particularly amenable to situations in which the surface to which the shipping label area was affixed was inverted between the shipping box and compacted configurations. FIG. 11 provides an example of a shipping box using two separate shipping label areas. As illustrated, shipping label 1106 is attached or inserted into a shipping label area integrated with the exterior of the shipping box in the shipping container state, while shipping label 1107 is attached to or inserted into a shipping label area integrated with an exterior of the integrated stuff sack 1103.

FIG. 12 illustrates a shipping label area in two states 1200 and 1202. The shipping label area undergoes transition 1201 to switch between the two states. Transition 1201 involves detaching a flap and rotating it across its hinge to seal Velcro segment 1204 to Velcro segment 1205. These Velcro segments could be replaced by the paired ends of any fastening device such as magnets, snaps, laces, straps, sealing strips, adhesives, buttons, plastic or metal hooks, and the like. The shipping label area can undergo a reverse transition by detaching the flap and rotating it back to seal segment 1207 against segment 1206. The shipping label area could be stitched or fused to the exterior surface of the shipping box. The shipping label areas could be stitched or fused to the exterior surface of the shipping box at an edge of the shipping box such that it was flat with a first side of the shipping box in one state and then flat with a second different side of the shipping box in a second state.

The flap of the shipping label area could comprise a material that was particularly amenable to forming a strong connection to adhesive shipping labels. The flap could include a pocket or sleeve with a transparent cover to receive shipping labels. The flap could include a single pocket in which two shipping labels were placed back to back, or two separate pockets with a solid divider between them. The pocket could be sealed using and of the fastening devices mentioned above that are used to secure the shipping label area in one of its two states. In any of these cases, address label 1202 could be displayed in state 1200 while address label 1203 was displayed in state 1202.

The labels displayed by the shipping label area in its two states could be similar prepaid shipping labels attached by the user that first sent the box out through the mail, but with the return and recipient addresses switched between label 1202 and 1203. In this situation, the recipient could return the box by simply switching the state of the shipping label area. This approach would work in situations in which the box was being sent out and returned in the same state. In other words, it would be effective regardless of whether or not the state of the shipping box was changed by the recipient before sending it back into the mail. Furthermore, the approaches described with reference to FIG. 12 can be applied to reusable shipping containers generally such as reusable envelopes and mailer bags, and are not limited to use with reusable shipping boxes. The design could also be augmented to include multiple flaps to allow the same shipping container to pass through a chain of recipients where each user was enabled to continue sending the box through the chain by turning another one of the flaps like the turning of pages in a book.

Thermal Insulation

The walls of the shipping box can be augmented to make the shipping box thermally insulated. Such approaches could be useful for the shipment of items such as specific pharmaceuticals, food stuffs, flowers, or any other perishable goods. Generally, a thermally insulating container will be bulkier than one that is not with all else held equal. As a result, the amount of material consumed in each shipment is greater for the shipment of items in thermally insulating boxes. Therefore, the reusable solutions disclosed herein are particularly valuable in this application. The approaches disclosed herein allow for a high level of thermal insulation while maintaining a high degree of reusability and a minimized volume when the shipping box is in the compacted state.

One approach for minimizing the size of the compacted state of a reusable thermally insulating shipping box is through the inclusion of air pockets in the walls of the shipping box that can be inflated in the shipping box state and deflated in the compacted state. The air pocket can be made of polyethylene, polypropylene, or PEVA plastic. The pockets can be discarded and can be made of recyclable material to minimize waste. In another approaches, the pockets can be deflated and reused by including them in the compacted state for a return trip through the mail. To facilitate this, the air pockets can be inter-connected so that a central fill/deflate valve can be used to fill multiple air pockets at one time. This valve can allow for easy fill and easy deflating and be able to receive an air hose fitting. In certain approaches the air pockets will be PEVA with a thickness in excess of 0.2 mm such that they are capable of being certified to withstand over 200 uses.

The air pockets will provide both thermal insulation to the chamber of the shipping box, and can also provide content protection. Additional disclosures regarding possibilities for the air pockets that can be used in combination with the disclosure herein can be found in U.S. patent application Ser. No. 14/918,218 (U.S. Pat. App. Pub. No. 2016/0039574), the disclosure of which is incorporated by reference in its entirety herein for all purposes.

Additional materials, either alone or in combination, can be added to the walls of the shipping box in a similar fashion to the air pockets described above. For example, the walls could include a reflective layer, a foam layer, a layer of thick plastic, or any other material to enhance the thermal insulation of the walls. The reflective layer could be Mylar or another form of thermally reflective material. The foam could be an open celled foam. The open celled foam could be polyethylene. The foam could be encased hermetically in order to protect the foam from gathering bacteria in its channels. This could be done using a plastic lining. In approaches in which both a foam and a reflective material were added to the walls, the foam could be hermetically sealed using the reflective material. The thick plastic could be corrugated plastic. The corrugated plastic could be the rigid member mentioned above in prior sections and could be used for structural reasons. The plastic could be polypropylene or recycled PET.

The various thermally insulating materials that are added to the walls of the shipping box can be removed from the walls and can be discarded after each use of the shipping box, or they can be repackaged with the rest of the shipping box in the compact state in a different configuration and sent back through the mail for reuse. The removal of the thermally insulating material from the walls may facilitate the reconfiguration of the shipping box from the shipping box state to the compacted state. In particular, some of the thermally insulating features could span certain fold lines of the box in the shipping box state such that they would interfere with the folding of the shipping box into the compacted state. In these cases, removal of the thermally insulating material could be essential to the folding of the shipping box into a compact state.

The thermally insulating materials could be alternatively secured and removed via a detachable and re-attachable seam on the walls of the shipping box. The seam could be secured via Velcro, a plastic zipper, or any of the zippers described above that are used to transition the shipping box between the compacted and shipping box state. For example, the seam could be sealed at the same time adjacent sidewalls of the shipping box were pulled together where the two sides of the seam were on those two adjacent sidewalls. The zipper used to secure the insulating materials, and the zipper used to allow for reconfiguration of the shipping box, could be zinc-alloy zippers or plastic zippers. The zippers could also be waterproofed with an overlay to restrict airflow and add to the thermal insulation of the shipping box. The overlay could be TPU or some other plastic.

Figure 13:
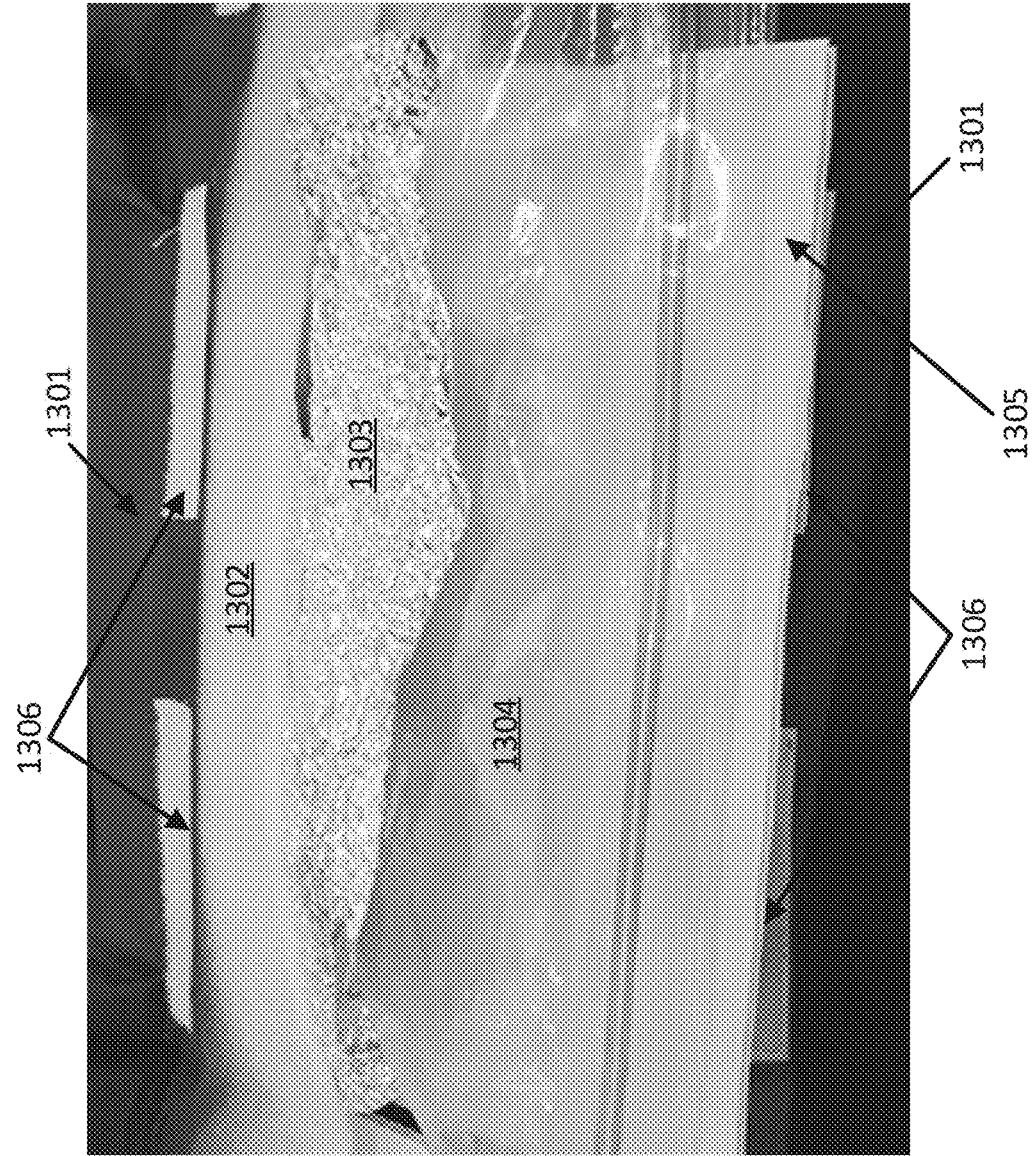
FIG. 13 illustrates a thermally insulative wall structure for a reusable shipping box.

FIG. 13 is an illustration of a sidewall 1300 of a thermally insulating reusable shipping box. Sidewall 1300 uses a particular combination of the numerous disclosures provided above. Sidewall 1300 includes a collection of thermally insulating materials located between two sheets of a pliant sheathing layer. As illustrated, the pliant sheathing layer 1301 is fabric but it could be a thin layer of plastic as mentioned above. The thermally insulating materials include a layer of open celled polyethylene foam 1302, a thermally reflective layer of Mylar 1303, an air pocket 1304, and a layer of corrugated plastic 1305. The corrugated plastic could serve as the rigid member for the shipping box sidewalls described previously in this disclosure. In this example, all of the thermally insulating material is secured by Velcro strips 1306. The approach in FIG. 13 could be modified slightly such that the thermally insulating material was secured using a zipper. The approach could also be modified to include additional thermally insulating layers such as a layer of plastic film underneath fabric layer 1301 just before the layer of corrugated plastic 1305.

Although the reusable shipping boxes have been illustrated generally as cuboids, other shapes are possible. For example, the shipping box may be configured in a variety of shapes such as cylindrical, hexagonal and triangular. The walls can be customized for shape, size, color, and graphics. To improve durability, the shipping boxes may be fabricated using double-stitched seams, and materials for the shipping boxes may be water-resistant, such as with coatings. In some embodiments, the shipping containers may have anti-microbial treatment to maintain cleanliness of the bag over repeated usages, with air-exchange vents to help with air flow to kill bacteria.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the fasteners mentioned in this disclosure could be replaced by hook-and-loop materials, magnets, snaps, laces, straps, sealing strips, adhesives, buttons, plastic or metal hooks, and the like. These and other modifications and variations to the present invention may be practiced by those of ordinary skill in the art, without departing from the scope of the present invention. Furthermore, those of ordinary skill in the art will appreciate that the foregoing description is by way of example only, and is not intended to limit the invention. Thus, it is intended that the present subject matter covers such modifications and variations.

What is claimed is:

1. A reusable shipping box with a shipping container state and a compacted state, comprising:
   a lid that seals the shipping box;
   a base;
   a set of four sidewalls;
   a zipper that: (i) zips down from the lid to the base between two adjacent sidewalls in the set of four sidewalls; (ii) is closed in the shipping container state; (iii) is open in the compacted state; and (iv) zips diagonally across the base; and
   a cavity that is: (i) surrounded by the set of four sidewalls, the lid, and the base in the shipping container state; (ii) accessible via the lid when the shipping box is open; and (iii) collapsed in the compacted state.

2. The reusable shipping box of claim 1, wherein:
   the zipper seals the lid to first, second and third sidewalls in the set of four sidewalls when the shipping box is sealed; and
   the lid is permanently attached to a fourth sidewall in the set of four sidewalls when the shipping box is open.

3. The reusable shipping box of claim 2, further comprising:
   a set of panels;
   wherein the lid, each sidewall in the set of four sidewalls, and the base each include at least two panels from the set of panels;

wherein each panel in the set of panels is separated from at least one other panel in the set of panels by a fold line; and wherein a first panel of the lid is separated from a first panel of a sidewall by a fold line.

4. The reusable shipping box of claim 1, further comprising:

a set of panels;

wherein the lid, each sidewall in the set of four sidewalls, and the base each include at least two panels from the set of panels; and wherein each panel in the set of panels is separated from at least one other panel in the set of panels by a fold line.

5. The reusable shipping box of claim 4, wherein:

each panel in the set of panels includes a rigid member surrounded by a pliant sheathing layer; and the rigid member is a thermoplastic polymer.

6. The reusable shipping box of claim 4, wherein:

each edge of each panel in the set of panels is one of: (i) a fold line; or (ii) a zipper tape extension connected to the pliant sheathing layer and having one set of zipper teeth; and the lid, each sidewall in the set of four sidewalls, and the base are all connected in a single unitary piece when the zipper is open and when the zipper is closed.

7. The reusable shipping box of claim 1, further comprising:

a first shipping label area integrated with an exterior surface of the reusable shipping box when the reusable shipping box is in the shipping container state; and a second shipping label area integrated with a second exterior surface of the reusable shipping box when the reusable shipping box is in the compacted state.

8. The reusable shipping box of claim 1, further comprising:

an integrated stuff sack fixed to the reusable shipping box;

wherein the integrated stuff sack is in the cavity in the shipping container state;

wherein the integrated stuff sack stores the reusable shipping box in the compacted state; and wherein the integrated stuff sack is inverted in a transition between the compacted and shipping container states.

9. The reusable shipping box of claim 8, further comprising:

a first shipping label area integrated with an exterior surface of the reusable shipping box when the reusable shipping box is in the shipping container state; and a second shipping label area integrated with an exterior surface of the integrated stuff sack when the reusable shipping box is in the compacted state.

10. The reusable shipping box of claim 1, further comprising:

a breach detector connected to the zipper; and a catch on the shipping box that connects to the breach detector in both the compacted state and the shipping box state.

11. A reusable shipping box, comprising:

a base;

a set of sidewalls;

a lid;

a cavity that is: (i) surrounded by the lid, the base, and the set of sidewalls when the shipping box is in a shipping container state; and (ii) collapsed when the shipping box is in a compacted state;

a zipper that: (i) seals the lid to three sidewalls in the set of sidewalls when it is fully zipped; (ii) allows the shipping box to be folded into the compacted state when it is fully unzipped; (iii) prevents the shipping box from being folded into the compacted state when it is half way zipped; and (iv) zips across a diagonal path through the base;

wherein a point on a first sidewall from the set of sidewalls is in contact with a point on a second sidewall from the set of sidewalls in the compacted state; and wherein the point on the first sidewall from the set of sidewalls is not in contact with the point on the second sidewall from the set of sidewalls in the shipping container state.

12. The reusable shipping box of claim 11, further comprising:

a set of panels;

wherein the lid, each sidewall in the set of sidewalls, and the base each include at least two panels from the set of panels;

wherein each panel in the set of panels is separated from at least one other panel in the set of panels by a fold line; and wherein a first panel of the lid is separated from a first panel of a sidewall by a fold line.

13. The reusable shipping box of claim 12, wherein:

each edge of each panel in the set of panels is one of: (i) a fold line; or (ii) a zipper tape extension connected to the pliant sheathing layer and having one set of zipper teeth; and the lid, each sidewall in the set of sidewalls, and the base are all connected in a single unitary piece when the zipper is fully unzipped and when the zipper is fully zipped.

14. The reusable shipping box of claim 11, further comprising:

a set of panels;

wherein the lid, each sidewall in the set of sidewalls, and the base each include at least two panels from the set of panels;

wherein each panel in the set of panels is separated from at least one other panel in the set of panels by a fold line;

wherein each panel in the set of panels includes a rigid member surrounded by a pliant sheathing layer; and wherein the rigid member is a thermoplastic polymer.

15. The reusable shipping box of claim 11, further comprising:

a first shipping label area integrated with an exterior surface of the reusable shipping box when the reusable shipping box is in the shipping container state; and a second shipping label area integrated with a second exterior surface of the reusable shipping box when the reusable shipping box is in the compacted state.

16. The reusable shipping box of claim 11, further comprising:

an integrated stuff sack fixed to the reusable shipping box;

wherein the integrated stuff sack is in the cavity in the shipping container state;

wherein the integrated stuff sack stores the reusable shipping box in the compacted state; and wherein the integrated stuff sack is inverted in a transition between the compacted and shipping container states.

17. The reusable shipping box of claim 16, further comprising:

a first shipping label area integrated with an exterior surface of the reusable shipping box when the reusable shipping box is in the shipping container state;

a second shipping label area integrated with an exterior surface of the integrated stuff sack when the reusable shipping box is in the compacted state.

18. The reusable shipping box of claim 11, further comprising:
a set of panels;
wherein the lid and each sidewall in the set of sidewalls each include at least two panels from the set of panels;
wherein the base includes four panels from the set of panels;
wherein each panel in the set of panels is separated from at least one other panel in the set of panels by a fold line;
wherein the base includes a first fold line and a second fold line;
wherein the first fold line and the second fold line are each normal to the diagonal path;
wherein the first fold line extends from the diagonal path to a first corner of the base;
wherein the second fold line extends from the diagonal path to a second corner of the base; and
wherein each panel in the set of panels includes a rigid member surrounded by a pliant sheathing layer.

19. The reusable shipping box of claim 11, wherein:
a security feature connects a zipper slider of the zipper to a fixed point on the reusable shipping box proximate a bottom stop of the zipper; and
the security feature is a mechanical key lock, a zip tie, or an electromechanical NFC—responsive lock.

20. A shipping box with a shipping container state and a compacted state, comprising:
a set of sides including:
a lid that seals the shipping box;
a base;
a set of sidewalls;
a zipper that: (i) zips down from the lid to the base between two adjacent sidewalls in the set of sidewalls; (ii) seals the lid to three sidewalls in the set of sidewalls when the shipping box is sealed; (iii) zips diagonally across a diagonal path through the base; (iv) is closed in the shipping container state; and (v) is open in the compacted state;
a cavity that is: (i) surrounded by the set of sidewalls, the lid, and the base in the shipping container state; (ii) accessible via the lid when the shipping box is open; and (iii) collapsed in the compacted state; and
a first shipping label area integrated with an exterior surface of the reusable shipping box when the reusable shipping box is in the shipping container state.

21. The reusable shipping box of claim 20, further comprising:
a set of panels;
wherein the lid, each sidewall in the set of sidewalls, and the base each include at least two panels from the set of panels; and
wherein each panel in the set of panels is separated from at least one other panel in the set of panels by a fold line.

22. The reusable shipping box of claim 21, wherein:
each panel in the set of panels includes a rigid member surrounded by a pliant sheathing layer; and
the rigid member is a thermoplastic polymer.

23. The reusable shipping box of claim 20, further comprising:
a set of panels;
wherein each side in the set of sides includes at least two panels from the set of panels; wherein the base includes four panels from the set of panels;
wherein each panel in the set of panels is separated from at least one other panel in the set of panels by a fold line;
wherein the base includes a first fold line and a second fold line;
wherein the first fold line and the second fold line are each normal to the diagonal path; wherein the first fold line extends from the diagonal path to a first corner of the base; wherein the second fold line extends from the diagonal path to a second corner of the base; and
wherein each panel in the set of panels includes a rigid member surrounded by a pliant sheathing layer.

24. The reusable shipping box of claim 20, further comprising:
an integrated stuff sack fixed to the reusable shipping box;
a first shipping label area integrated with an exterior surface of the reusable shipping box when the reusable shipping box is in the shipping container state;
a second shipping label area integrated with an exterior surface of the integrated stuff sack when the reusable shipping box is in the compacted state;
wherein the integrated stuff sack is in the cavity in the shipping container state;
wherein the integrated stuff sack stores the reusable shipping box in the compacted state; and
wherein the integrated stuff sack is inverted in a transition between the compacted and shipping container states.

* * * * *